US012804590B2

(12) United States Patent
Wright et al.

(10) Patent No.: US 12,804,590 B2
(45) Date of Patent: Nov. 17, 2026

(54) LOCATION DETERMINATION OF A DEVICE BASED ON DIRECTIONAL INFORMATION OF SIGNALS

(71) Applicant: Juniper Networks, Inc., Sunnyvale, CA (US)

(72) Inventors: Christopher Wesley Wright, Scotts Valley, CA (US); Mohammad Zohoorian, San Francisco, CA (US); Nagarjun Srinivasan, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 163 days.

(21) Appl. No.: 19/040,194

(22) Filed: Jan. 29, 2025

(65) Prior Publication Data

US 2025/0267618 A1 Aug. 21, 2025

Related U.S. Application Data

(60) Provisional application No. 63/554,409, filed on Feb. 16, 2024.

(51) Int. Cl.
*H04W 64/00* (2009.01)
*G01S 13/76* (2006.01)

(52) U.S. Cl.
CPC ........... *H04W 64/00* (2013.01); *G01S 13/765* (2013.01)

(58) Field of Classification Search
CPC .............................. H04W 64/00; H04W 24/10
See application file for complete search history.

(56) References Cited

U.S. PATENT DOCUMENTS 9,729,439 B2 8/2017 MeLampy et al.
9,729,682 B2 8/2017 Kumar et al.
9,762,485 B2 9/2017 Kaplan et al.
(Continued)

OTHER PUBLICATIONS

Bianchi et al., "Impact of Chosen Error Criteria in RSS-based Localization: Power vs Distance vs Relative Distance Error Minimization", 2007 12th IEEE Symposium on Computers and Communications, IEEE, Jul. 1, 2007, pp. MW 9-MW 14.
(Continued)

*Primary Examiner* — Michael T Vu
(74) *Attorney, Agent, or Firm* — Shumaker & Sieffert P.A.

(57) ABSTRACT

Techniques describe a network management system comprising a memory and processing circuitry configured to obtain distance measurements between at least two devices at a site, wherein the at least two devices comprise at least one reference device positioned at a known location and a target device relative to the at least one reference device positioned at an unknown location. The processing circuitry may further be configured to obtain directional information specifying a direction of one or more signals communicated between the at least one reference device and the target device. The processing circuitry may further be configured to determine, based on the distance measurements and the directional information, a plurality of possible positions of the target device relative to the at least one reference device. The processing circuitry may further be configured to determine, based on the directional information, a candidate position from the plurality of possible positions.

20 Claims, 10 Drawing Sheets

(56) References Cited

U.S. PATENT DOCUMENTS

| | | | | |
|---|---|---|---|---|
| 9,832,082 | B2 | 11/2017 | Dade et al. | |
| 9,871,748 | B2 | 1/2018 | Gosselin et al. | |
| 9,985,883 | B2 | 5/2018 | MeLampy et al. | |
| 10,200,264 | B2 | 2/2019 | Menon et al. | |
| 10,277,506 | B2 | 4/2019 | Timmons et al. | |
| 10,432,522 | B2 | 10/2019 | Kaplan et al. | |
| 10,756,983 | B2 | 8/2020 | Ratkovic et al. | |
| 10,862,742 | B2 | 12/2020 | Singh | |
| 10,958,537 | B2 | 3/2021 | Safavi | |
| 10,958,585 | B2 | 3/2021 | Safavi | |
| 10,985,969 | B2 | 4/2021 | Safavi | |
| 10,992,543 | B1 | 4/2021 | Rachamadugu et al. | |
| 11,075,824 | B2 | 7/2021 | McCulley et al. | |
| 11,510,172 | B1 * | 11/2022 | Feng | G01S 5/14 |
| 12,170,935 | B2 | 12/2024 | Zohoorian et al. | |
| 2021/0306201 | A1 | 9/2021 | Wang et al. | |
| 2023/0080610 | A1 | 3/2023 | Zohoorian et al. | |
| 2023/0089054 | A1 * | 3/2023 | Gurelli | G01S 3/46<br>342/378 |
| 2023/0217211 | A1 | 7/2023 | Duan et al. | |
| 2025/0119744 | A1 * | 4/2025 | Korbis | H04W 8/22 |

OTHER PUBLICATIONS

Extended Search Report from counterpart European Application No. 25157874.6 dated Jun. 30, 2025, 9 pp.

* cited by examiner

LOCATION DETERMINATION OF A DEVICE BASED ON DIRECTIONAL INFORMATION OF SIGNALS

This application claims the benefit of U.S. Provisional Patent Application No. 63/554,409, filed 16 Feb. 2024, the entire contents of which is incorporated herein by reference.

TECHNICAL FIELD

The disclosure relates generally to computer networks and, more specifically, to monitoring and troubleshooting computer networks.

BACKGROUND

Commercial premises or sites, such as offices, hospitals, airports, stadiums, or retail outlets, often install complex wireless network systems, including a network of wireless access points (APs), throughout the premises to provide wireless network services to one or more wireless client devices (or simply, "clients"). APs are physical, electronic devices that enable other devices to wirelessly connect to a wired network using various wireless networking protocols and technologies, such as wireless local area networking protocols conforming to one or more of the IEEE 802.11 standards (i.e., "WiFi"), Bluetooth/Bluetooth Low Energy (BLE), mesh networking protocols such as ZigBee or other wireless networking technologies. Many different types of wireless client devices, such as laptop computers, smartphones, tablets, wearable devices, appliances, and Internet of Things (IoT) devices, incorporate wireless communication technology and can be configured to connect to wireless access points when the device is in range of a compatible wireless access point in order to access a wired network. In the case of a client device running a cloud-based application, such as voice over Internet Protocol (VOIP) applications, streaming video applications, gaming applications, or video conference applications, data is exchanged during an application session from the client device through one or more APs and one or more wired network devices, e.g., switches, routers, and/or gateway devices, to reach the cloud-based application server.

SUMMARY

In general, this disclosure describes one or more techniques for determining a location of devices at a site based on directional information of signals. For example, a network management system configured to manage wireless networks at a site may determine a location (e.g., a relative distance between devices) and/or orientation (e.g., a rotational position of devices) of devices at the site and use such determination to place the devices on a site map used to understand the deployment of devices at the site. A network management system may use, for example, a localization algorithm (e.g., multilateration techniques) to determine the location of a target device based on a determined distance between a target device (e.g., a target access point or target client device) and one or more reference devices (e.g., reference access point(s)). For instance, the network management system may obtain distance measurements (e.g., measurements determined based on a fine timing measurements protocol) between at least one reference device and the target device based on one or more wireless signals exchanged between the at least one reference device and the target device and determine a location of the target device at the site based on the distance measurements. However, determining the location of the target device based simply on distance measurements may produce ambiguous results, such as when a target device is determined to be in two or more possible locations that are equidistant or near equidistant to the at least one reference device, referred to herein as "flip ambiguity," which may further result in the incorrect placement of the target device on the site map. In addition, environmental interference, scarcity of reference devices, and/or other factors may cause inaccurate distance measurements used to determine the location of the target device.

The techniques described herein supplement distance measurements used to determine the location of a target device at a site with directional information of signals communicated between at least one reference device and the target device to resolve ambiguities or compensate for inaccurate distance measurements. For example, the network management system may obtain directional information that specifies a direction of one or more signals (e.g., BLUETOOTH Low Energy (BLE) signals, etc.) communicated between an antenna of the at least one reference device and an antenna of the target device. Based on the distance measurements and directional information, the network management system may detect a localization error of one or more devices, such as determining the target device has two or more possible positions. The network management system may determine a candidate position of the target device from the two or more possible positions of the target device based on the directional information. For example, the network management system may determine, based on the directional information specifying a direction of one or more signals between the at least one reference device and the target device, a relative orientation between the at least one reference device and the target device, which may indicate a candidate position of the target device relative to the reference device.

In one example, the disclosure is directed to a network management system comprising memory and one or more processors in communication with the memory and configured to obtain distance measurements between at least two devices at a site, wherein the at least two devices comprise at least one reference device positioned at a known location at the site and a target device relative to the at least one reference device positioned at an unknown location at the site. The one or more processors may further be configured to obtain directional information specifying a direction of one or more signals communicated between the at least one reference device and the target device. The one or more processors may further be configured to determine, based on the distance measurements and the directional information, two or more possible positions of the target device relative to the at least one reference device. The one or more processors may further be configured to determine, based on the directional information, a candidate position from the two or more possible positions of the target device relative to the at least one reference device.

In another example, the disclosure is directed to a method comprises obtaining distance measurements between at least two devices at a site, wherein the at least two devices comprise at least one reference device positioned at a known location at the site and a target device relative to the at least one reference device positioned at an unknown location at the site. The method further comprises obtaining directional information specifying a direction of one or more signals communicated between the at least one reference device and the target device. The method further comprises determining, based on the distance measurements and the directional information, two or more possible positions of the target device relative to the at least one reference device. The method further comprises determining, based on the directional information, a candidate position from the two or more possible positions of the target device relative to the at least one reference device.

In yet another example, the disclosure is directed to non-transitory computer-readable storage media comprising instructions that, when executed, cause one or more processors to obtain distance measurements between at least two devices at a site, wherein the at least two devices comprise at least one reference device positioned at a known location at the site and a target device relative to the at least one reference device positioned at an unknown location at the site. The instructions may further cause the one or more processors to obtain directional information specifying a direction of one or more signals communicated between the at least one reference device and the target device. The instructions may further cause the one or more processors to determine, based on the distance measurements and the directional information, two or more possible positions of the target device relative to the at least one reference device. The instructions may further cause the one or more processors to determine, based on the directional information, a candidate position from the two or more possible positions of the target device relative to the at least one reference device.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Figure 1A:
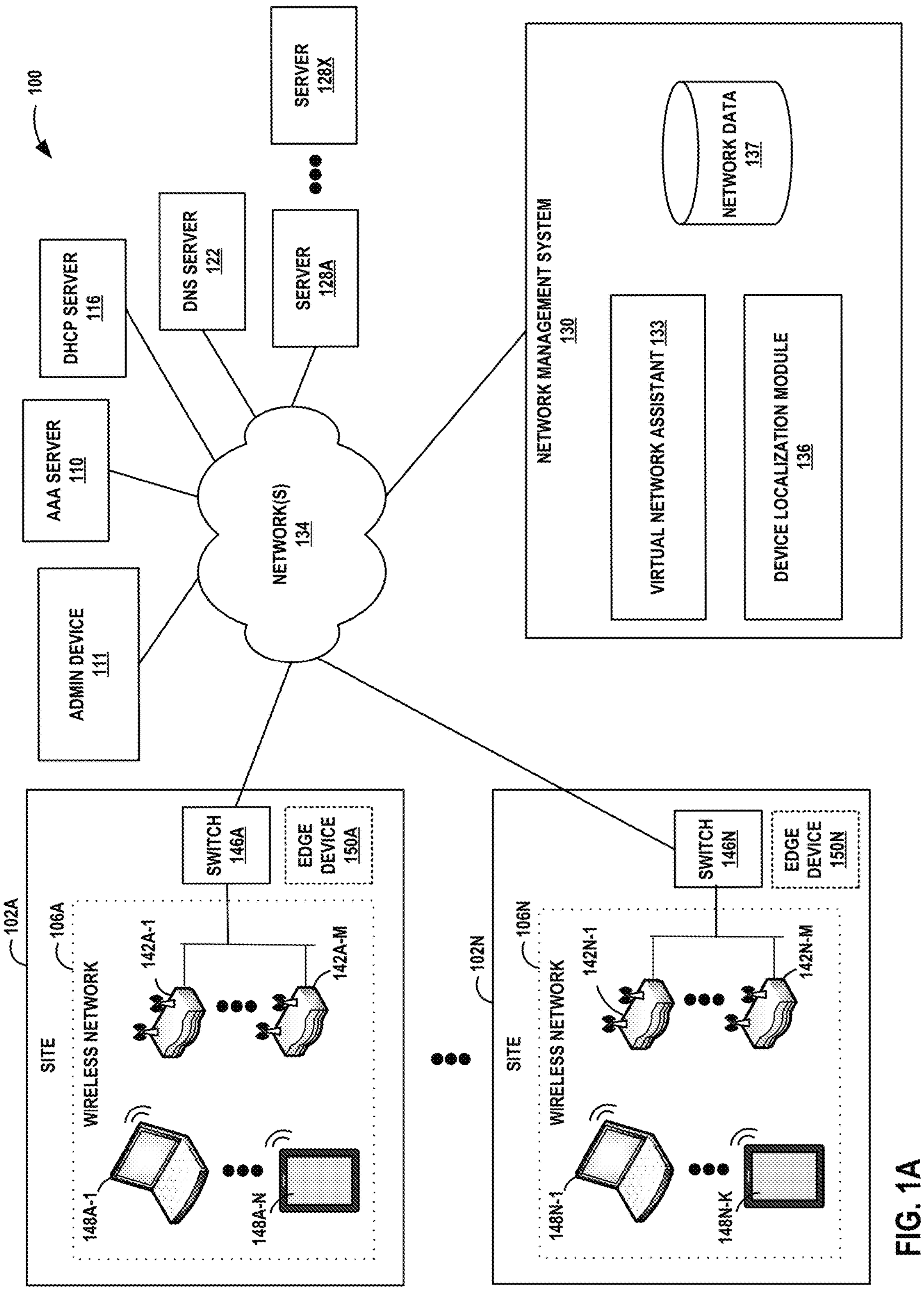
FIG. 1A is a block diagram of an example network system including a network management system, in accordance with one or more techniques of the disclosure.

FIG. 1A is a block diagram of an example network system 100 including network management system (NMS) 130, in accordance with one or more techniques of this disclosure. Example network system 100 includes a plurality sites 102A-102N at which a network service provider manages one or more wireless networks 106A-106N, respectively. Although in FIG. 1A each site 102A-102N is shown as including a single wireless network 106A-106N, respectively, in some examples, each site 102A-102N may include multiple wireless networks, and the disclosure is not limited in this respect.

Each site 102A-102N includes a plurality of network access server (NAS) devices, such as access points (APs) 142, switches 146, or routers (not shown). For example, site 102A includes a plurality of APs 142A-1 through 142A-N (collectively referred to herein as "APs 142A"). Similarly, site 102N includes a plurality of APs 142N-1 through 142N-M (collectively referred to herein as "APs 142N"). Each AP 142 may be any type of wireless access point, including, but not limited to, a commercial or enterprise AP, a router, or any other device that is connected to a wired network and is capable of providing wireless network access to client devices within the site.

Each site 102A-102N also includes one or more client devices, otherwise known as user equipment devices (UEs), referred to generally as UEs or client devices 148, representing various wireless-enabled devices within each site. For example, a plurality of UEs 148A-1 through 148A-N are currently located at site 102A. Similarly, a plurality of UEs 148N-1 through 148N-M are currently located at site 102N. Each UE 148 may be any type of wireless client device, including, but not limited to, a mobile device such as a smart phone, tablet or laptop computer, a personal digital assistant (PDA), a wireless terminal, a smart watch, smart ring, or other wearable device. UEs 148 may also include wired client-side devices, e.g., IoT devices such as printers, security devices, environmental sensors, or any other device connected to the wired network and configured to communicate over one or more wireless networks 106. References to "N" or "M" may represent any number of devices. References to "N" for different elements need not be the same number. Similarly, references to "M" for different elements need not be the same number.

In order to provide wireless network services to UEs 148 and/or communicate over the wireless networks 106, APs 142 and the other wired client-side devices at sites 102 are connected, either directly or indirectly, to one or more network devices (e.g., switches, routers, or the like) via physical cables, e.g., Ethernet cables. In the example of FIG. 1A, site 102A includes a switch 146A to which each of APs 142A-1 through 142A-N at site 102A is connected. Similarly, site 102N includes a switch 146N to which each of APs 142N-1 through 142N-M at site 102N are connected. Although illustrated in FIG. 1A as if each site 102 includes a single switch 146 and all APs 142 of the given site 102 are connected to the single switch 146, in other examples, each site 102 may include more or fewer switches and/or routers. In addition, the APs and the other wired client-side devices of the given site may be connected to two or more switches and/or routers. In addition, two or more switches at a site may be connected to each other and/or connected to two or more routers, e.g., via a mesh or partial mesh topology in a hub-and-spoke architecture. In some examples, interconnected switches and routers comprise wired local area networks (LANs) at sites 102 hosting wireless networks 106.

Example network system 100 also includes various networking components for providing networking services within the wired network including, as examples, an Authentication, Authorization and Accounting (AAA) server 110 for authenticating users and/or UEs 148, a Dynamic Host Configuration Protocol (DHCP) server 116 for dynamically assigning network addresses (e.g., IP addresses) to UEs 148 upon authentication, a Domain Name System (DNS) server 122 for resolving domain names into network addresses, a plurality of servers 128A-128N (collectively "servers 128") (e.g., web servers, databases servers, file servers and the like), and a network management system (NMS) 130. As shown in FIG. 1A, the various devices and systems of network 100 are coupled together via one or more network(s) 134, e.g., the Internet and/or an enterprise intranet.

In the example of FIG. 1A, NMS 130 is a cloud-based computing platform that manages wireless networks 106A-106N at one or more of sites 102A-102N. As further described herein, NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, and alert generation. In some examples, NMS 130 outputs notifications, such as alerts, alarms, graphical indicators on dashboards, log messages, text/SMS messages, email messages, and the like, and/or recommendations regarding wireless network issues to a site or network administrator ("admin") interacting with and/or operating admin device 111. Additionally, in some examples, NMS 130 operates in response to configuration input received from the administrator interacting with and/or operating admin device 111.

The administrator and admin device 111 may comprise IT personnel and an administrator computing device associated with one or more of sites 102. Admin device 111 may be implemented as any suitable device for presenting output and/or accepting user input. For instance, admin device 111 may include a display. Admin device 111 may be a computing system, such as a mobile or non-mobile computing device operated by a user and/or by the administrator. Admin device 111 may, for example, represent a workstation, a laptop or notebook computer, a desktop computer, a tablet computer, or any other computing device that may be operated by a user and/or present a user interface in accordance with one or more aspects of the present disclosure. Admin device 111 may be physically separate from and/or in a different location than NMS 130 such that admin device 111 may communicate with NMS 130 via network 134 or other means of communication.

In some examples, one or more of the NAS devices, e.g., APs 142, switches 146, or routers, may connect to edge devices 150A-150N via physical cables, e.g., Ethernet cables. Edge devices 150 comprise cloud-managed, wireless local area network (LAN) controllers. Each of edge devices 150 may comprise an on-premises device at a site 102 that is in communication with NMS 130 to extend certain microservices from NMS 130 to the on-premises NAS devices while using NMS 130 and its distributed software architecture for scalable and resilient operations, management, troubleshooting, and analytics.

Each one of the network devices of network system 100, e.g., servers 110, 116, 122 and/or 128, APs 142, UEs 148, switches 146, and any other servers or devices attached to or forming part of network system 100, may include a system log or an error log module wherein each one of these network devices records the status of the network device including normal operational status and error conditions. Throughout this disclosure, one or more of the network devices of network system 100, e.g., servers 110, 116, 122 and/or 128, APs 142, UEs 148, and switches 146, may be considered "third-party" network devices when owned by and/or associated with a different entity than NMS 130 such that NMS 130 does not receive, collect, or otherwise have access to the recorded status and other data of the third-party network devices. In some examples, edge devices 150 may provide a proxy through which the recorded status and other data of the third-party network devices may be reported to NMS 130.

In some examples, NMS 130 monitors network data 137, e.g., one or more service level expectation (SLE) metrics, received from wireless networks 106A-106N at each site 102A-102N, respectively, and manages network resources, such as APs 142 at each site, to deliver a high-quality wireless experience to end users, IoT devices and clients at the site. For example, NMS 130 may include a virtual network assistant (VNA) 133 that implements an event processing platform for providing real-time insights and simplified troubleshooting for IT operations, and that automatically takes corrective action or provides recommendations to proactively address wireless network issues. VNA 133 may, for example, include an event processing platform configured to process hundreds or thousands of concurrent streams of network data 137 from sensors and/or agents associated with APs 142 and/or nodes within network 134. For example, VNA 133 of NMS 130 may include an underlying analytics and network error identification engine and alerting system in accordance with various examples described herein. The underlying analytics engine of VNA 133 may apply historical data and models to the inbound event streams to compute assertions, such as identified anomalies or predicted occurrences of events constituting network error conditions. Further, VNA 133 may provide real-time alerting and reporting to notify a site or network administrator via admin device 111 of any predicted events, anomalies, trends, and may perform root cause analysis and automated or assisted error remediation. In some examples, VNA 133 of NMS 130 may apply machine learning techniques to identify the root cause of error conditions detected or predicted from the streams of network data 137. If the root cause may be automatically resolved, VNA 133 may invoke one or more corrective actions to correct the root cause of the error condition, thus automatically improving the underlying SLE metrics and also automatically improving the user experience.

Further example details of operations implemented by the VNA 133 of NMS 130 are described in U.S. Pat. No. 9,832,082, issued Nov. 28, 2017, and entitled "Monitoring Wireless Access Point Events," U.S. Publication No. US 2021/0306201, published Sep. 30, 2021, and entitled "Network System Fault Resolution Using a Machine Learning Model," U.S. Pat. No. 10,985,969, issued Apr. 20, 2021, and entitled "Systems and Methods for a Virtual Network Assistant," U.S. Pat. No. 10,958,585, issued Mar. 23, 2021, and entitled "Methods and Apparatus for Facilitating Fault Detection and/or Predictive Fault Detection," U.S. Pat. No. 10,958,537, issued Mar. 23, 2021, and entitled "Method for Spatio-Temporal Modeling," and U.S. Pat. No. 10,862,742, issued Dec. 8, 2020, and entitled "Method for Conveying AP Error Codes Over BLE Advertisements," all of which are incorporated herein by reference in their entirety.

In operation, NMS 130 observes, collects and/or receives network data 137, which may take the form of data extracted from messages, counters, and statistics, for example. In accordance with one specific implementation, a computing device is part of NMS 130. In accordance with other implementations, NMS 130 may comprise one or more computing devices, dedicated servers, virtual machines, containers, services, or other forms of environments for performing the techniques described herein. Similarly, computational resources and components implementing VNA 133 may be part of the NMS 130, may execute on other servers or execution environments, or may be distributed to nodes within network 134 (e.g., routers, switches, controllers, gateways, and the like).

NMS 130, or more specifically, for example, device localization module 136, may determine a location of devices at sites 102. For example, device localization module 136 may implement a localization algorithm, such as multilateration techniques, to determine the location of a target device (e.g., AP, UE, etc.) of site 102A based on distance measurements between the target device and one or more reference devices (e.g., APs with known locations) of site 102A. For instance, pairs of APs of APs 142A at site 102A, such as AP 142A-1 and AP 142A-N may exchange one or more signals to determine a distance between AP 142A-1 and AP 142A-N according to a fine timing measurement (FTM) protocol. FTM protocols may be implemented to determine distance measurements based on round trip time (RTT) measurements of wireless signals (e.g., Wi-Fi signals) exchanged between AP 142A-1 and AP 142A-N in accordance with, for example, an FTM protocol as described in IEEE 802.11-2016. In this example, the location of AP 142A-1 at site 102A is known (and may represent a reference device) and the location of AP 142A-N at site 102A is unknown (and may represent a target device). AP 142A-1 and/or AP 142A-N may determine the distance measurement between AP 142A-1 and AP 142A-N based on a two-way time-of-flight (ToF) estimation of the one or more wireless signals exchanged between AP 142A-1 and AP 142A-N, otherwise referred to as round trip time (RTT). NMS 130 may obtain the distance measurement between AP 142A-1 and AP 142A-N and, based on the distance measurement between AP 142A-1 and AP 142A-N, NMS 130 may determine the location of the target device, AP 142A-N, relative to the reference device, AP 142A-1. NMS 130 may obtain the distance measurements between other APs of APs 142A at site 102A. NMS 130 may also determine an orientation of APs 142 of site 102A (e.g., a rotational position of the APs) based on, for example, reference APs with known positions. The orientation of APs 142 may indicate a rotational direction of the target device, AP 142-N relative to the reference device, AP 142A-1. Additional examples of determining the location of devices and placing devices on a site map are described in U.S. application Ser. No. 17/811,784, entitled "Determining Locations of Deployed Access Points," filed Jul. 11, 2022, and additional examples of determining the orientation of devices are described in U.S. Pat. No. 17/651,526, entitled "Determining Orientation of Deployed Access Points," filed Feb. 17, 2022, the entire contents of each of which is incorporated by reference herein. While the example described above is described with respect to APs 142 determining the distance measurements between APs 142 of sites 102, NMS 130 may, in some examples, determine a distance measurement between the APs. For example, NMS 130 may obtain FTM data from APs 142 and determine the distance measurements between APs 142 based on the FTM data.

Based on the determined location and orientation of APs 142A of site 102A, NMS 130 may generate a site map that places APs 142A on a map of site 102A (e.g., place computer generated icons representing APs 142 on a site map). NMS 130 may maintain and manage a site map and provide the site map to an administrator of a network to enable the administrator to understand and/or augment the deployment of devices at a site, such as for indoor wayfinding and asset positioning, and/or other applications. The site map may include suggestions for site managers on the placement of new devices and/or rearrangement of devices already installed at a site to improve location solutions with more accurate device positioning that may result in quicker resolution of coverage gaps or channel interference. Continuing the example described above, NMS 130 may generate a map that outlines the dimensions of site 102A based on an image, blueprint, description, etc. of site 102A provided by an administrator of site 102A. NMS 130 may place a reference device (e.g., AP 142A-1 with a known location) on the map and place a target device (e.g., AP 142A-N) on the map based on a location of the target device determined from the distance measurements between AP 142A-1 and AP 142A-N.

In some instances, the use of multilateration techniques to determine the location of devices in a wireless network may result in ambiguous results (e.g., due to the degree of uncertainty and/or error of distance measurements based on fine timing measurements), such as when there are two or more possible locations for a device that are equidistant or near equidistant from at least one reference device. For instance, distance measurements for a target device that are determined from multilateration techniques may equally apply to two different positions of the target device. Ambiguous results may occur in instances where a device is in a more isolated and/or fringe sections of the site which may typically have a lower density of reference devices. With fewer reference devices, and thus less data to use in determining the location of devices, the location determination may be inaccurate, which may further result in the incorrect placement of devices on a site map.

In accordance with one or more techniques of this disclosure, NMS 130 is configured to determine the location of devices within sites 102 based on directional information of signals. For example, device localization module 136 of NMS 130 may obtain, in addition to the distance measurements, directional information of signals communicated between an antenna of at least one reference device and an antenna of the target device (e.g., directional information indicating a cardinal direction in degrees or radians relative to a reference device). The directional information may be included, for example, in wireless signals of communication protocols of a personal area network (e.g., BLUETOOTH low energy (BLE) signals or other 2.4 GHz signals). Based on the directional information of signals communicated between APs 142, device localization module 136 of NMS 130 may determine whether there are any localization errors of APs 142, such as when an AP is determined to be in a two or more possible positions. NMS 130 may, for example, determine whether directional information of a given AP (e.g., AP 142A-1), determined from signals communicated between AP 142A-1 to a target AP (e.g., AP 142A-N), is inconsistent with a an expected direction to AP 142A-N (e.g., obtained from the determination of orientation of APs described above) and may generate a flag or other value that indicates a discrepancy in direction to the target device. For example, NMS 130 may obtain directional information from AP 142A-1 that specifies a first direction of a BLE signal communicated between AP 142A-1 and AP 142A-N, and compare the first direction to a second direction indicative of an expected direction to AP 142A-N. NMS 130 may determine that the first direction is inconsistent with the second direction and may generate a flag that indicates a discrepancy in directional information of AP 142A-N relative to AP 142A-1. NMS 130 may identify discrepancies of directional information of other APs 142 and generate a flag or other value for each instance a discrepancy in directional information is identified. NMS 130 may compare the number of flags to a threshold, and if the threshold is satisfied, NMS 130 may determine that there may be an error in the determined locations of APs 142, such as an AP having two or more possible positions.

Alternatively, or additionally, NMS 130 may identify whether a distribution of possible positions of the target device form a multimodal distribution. For example, NMS 130 may generate a density plot based on the distance measurements (e.g., using a probability density function) between APs 142 and identify, for example, local maxima in the density plot that may be indicative of a possible position of the target device. If the distribution of distance measurements between APs 142 is multimodal (e.g., more than one local maxima in the density plot), NMS 130 may determine that there may be an error in the determined locations of APs 142, such as an AP having two or more possible positions.

In response to determining a target AP having two or more possible positions, NMS 130 may resolve the ambiguity in the plurality of possible positions of the target device based on the directional information of signals. For example, NMS 130 may determine, from the directional information of a BLE signal communicated between the antenna of reference device AP 142A-1 and the antenna of target device AP 142A-N, a candidate position of target device 142A-N from among the two or more possible positions of target device 142A-N. In some examples, NMS 130 may determine the candidate position based on directional information indicative of a direction in which one or more reference APs receive a loudest directional beam from the target AP and/or a direction in which the target AP receives a loudest directional beam from the one or more reference APs, as further described in FIG. 6.

Figure 6:
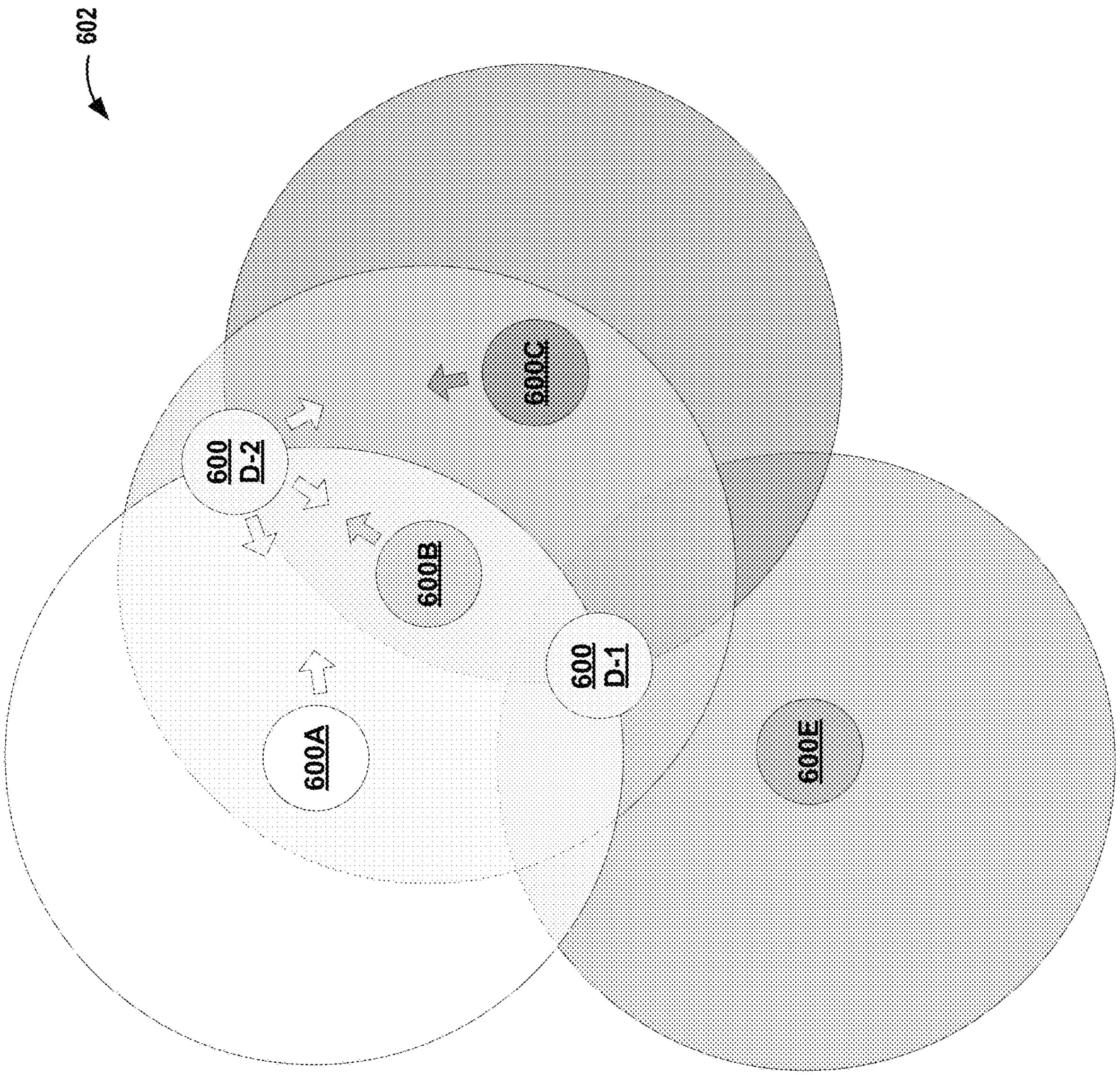
FIG. 6 illustrates an example of determining a location of a target device based on directional information of signals, in accordance with one or more techniques of this disclosure.

In some examples, NMS 130 may alternatively, or additionally, determine a candidate position of the target device based on information obtained from neighboring devices near the target device, as further described in FIG. 6. For example, information from a neighboring device near (e.g., within range of a Wi-Fi signal) the target device may indicate the neighboring device detected a wireless signal from the target device and thus the target device is likely in a possible position near the neighboring device. Alternatively, NMS 130 may eliminate possible positions of the target device that the neighboring devices did not detect a wireless signal from the target device. In some examples, NMS 130 may confirm the determination of the candidate position based on directional information with the determination of the candidate position based the information indicating whether the neighboring device detected a wireless signal from the target device.

Figure 7:
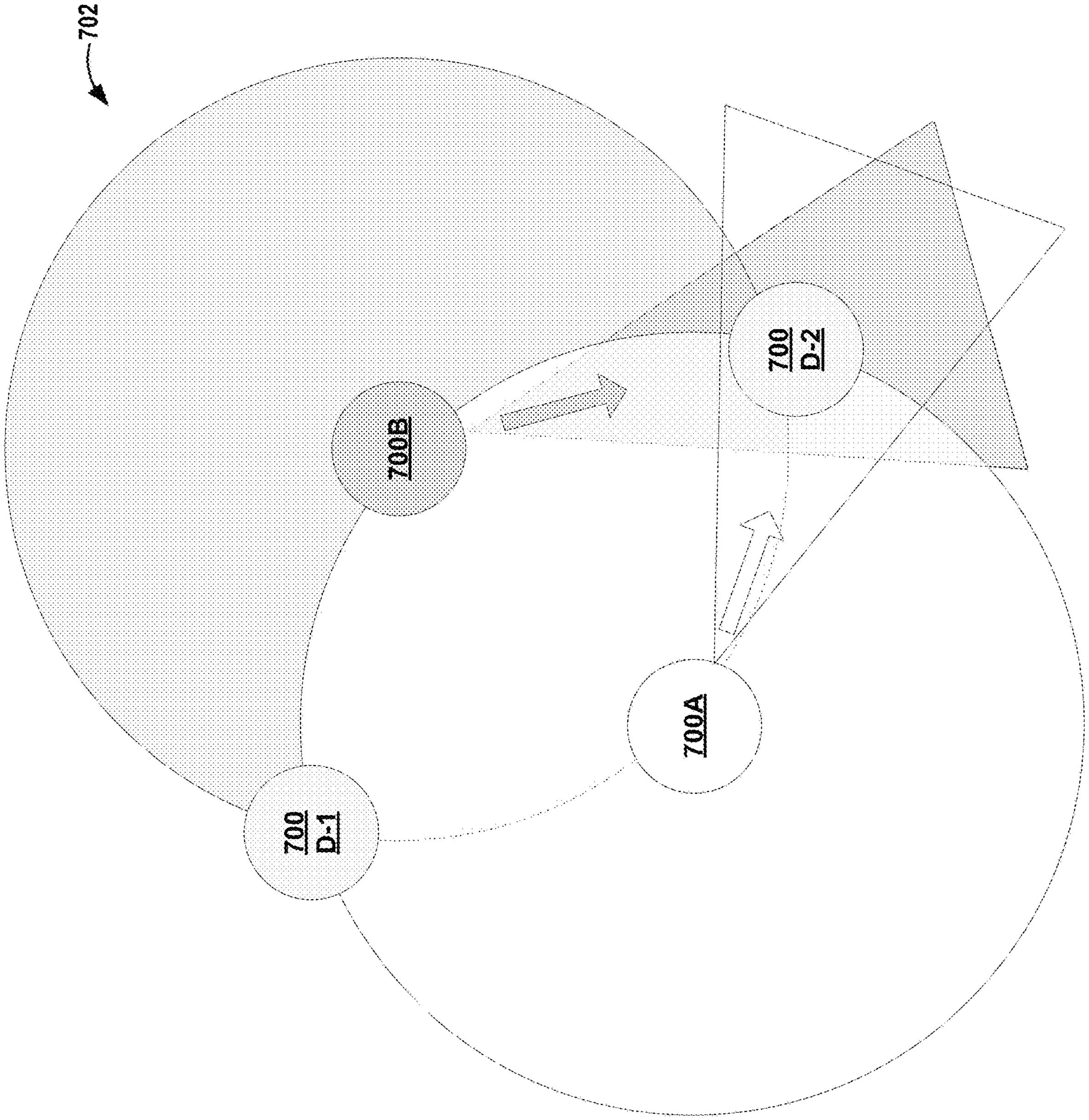
FIG. 7 illustrates an example of determining a location of a target device with limited reference devices based on directional information of signals, in accordance with one or more techniques of this disclosure.

In some examples in which there are a limited number of reference devices (and thus a limited number of distance measurements), NMS 130 may add an error bias to possible positions of a target device based on a signal specifying the directional information deviating from an expected direction of the signal, as further described in FIG. 7. As one example, AP 142A-1 may expect to receive a BLE signal from AP 142A-N in a first direction (e.g., south-west direction) based on distance measurements between AP 142A-N and AP 142A-1. NMS 130 may, in this example, obtain directional information of a BLE signal received by AP 142A-1 from AP 142A-N that specifies a second direction (e.g., south-east direction) that is inconsistent with the first direction, and in response, NMS 130 may add an error bias to possible positions corresponding to the first direction to indicate that possible positions of AP 142A-N in the first direction is an unlikely position of AP 142A-N. In this way, by adding an error bias to possible positions corresponding to directions of signals that deviate from expected directions of the signals, NMS 130 may collapse the multimodal distribution of possible positions of a target device to a single, likely candidate position.

Figure 8:
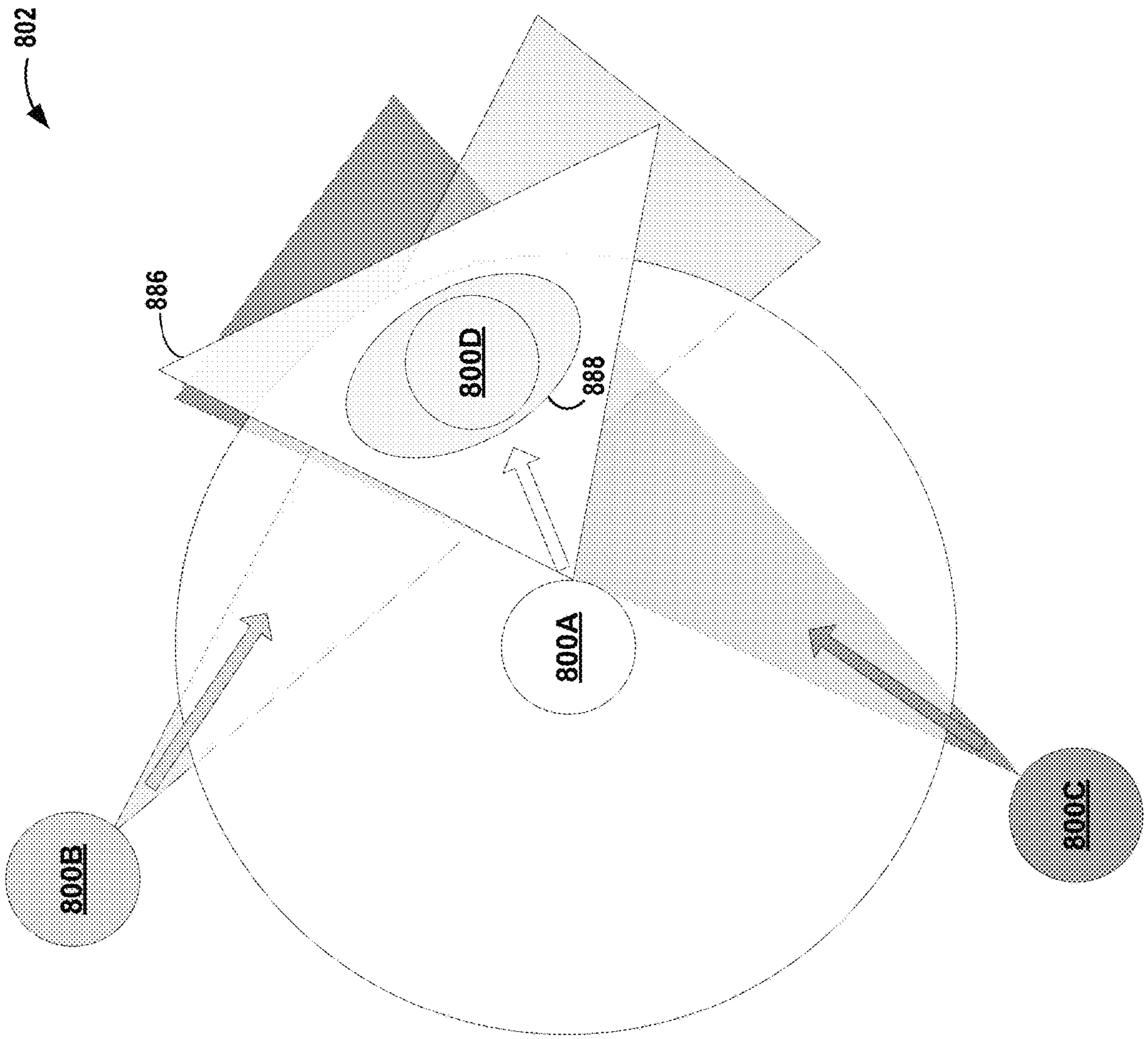
FIG. 8 illustrates an example of determining a location of a target device with a single reference device based on directional information of signals, in accordance with one or more techniques of this disclosure.

In some examples, NMS 130 may alternatively, or additionally, eliminate possible positions of a target device where only a single reference device is able to perform distance measurements, as further described in FIG. 8. The target device may be referred to herein as an "isolated target device." In these examples, the target device is in range of a Wi-Fi signal (e.g., 5 GHz signal) from only a single reference device, but may be in range of a BLE signal (e.g., 2.4 GHz signal) from one or more other devices that are unable to detect a Wi-Fi signal from the target device. Due to the lack of reference devices, NMS 130 may determine the position of the target device with a greater degree of uncertainty, such as within a large window of possible positions (i.e., two or more positions). NMS 130 may eliminate possible positions of the target device, such as determining a probability window (e.g., a tight area representing possible locations of the target device) based on directional information of BLE signals communicated between the one or more other devices that are unable to detect a Wi-Fi signal from the target device.

The techniques of this disclosure provide one or more technical advantages and practical applications. For example, by applying directional information to a localization algorithm, the techniques described herein may disambiguate possible positions of a target device (e.g., equidistant points representing possible positions of a target device or possible positions with a greater degree of uncertainty), therefore providing a more accurate estimation of a location of the target device. Moreover, by integrating directional information to the localization algorithm, the techniques described herein may provide a more accurate estimation of a location of the target device with fewer measurements, such as when fine timing measurement data is sparse due to fewer reference devices and/or degraded signals resulting from walls or other environmental interference. For example, the directional information adds a degree of validity to fewer measurements, thus allowing for more accurate localizations with less known positions.

Although the techniques of the present disclosure are described in this example as performed by NMS 130, techniques described herein may be performed by any other computing device(s), system(s), and/or server(s), and that the disclosure is not limited in this respect. For example, one or more computing device(s) configured to execute the functionality of the techniques of this disclosure may reside in a dedicated server or be included in any other server in addition to or other than NMS 130, or may be distributed throughout network 100, and may or may not form a part of NMS 130.

Figure 1B:
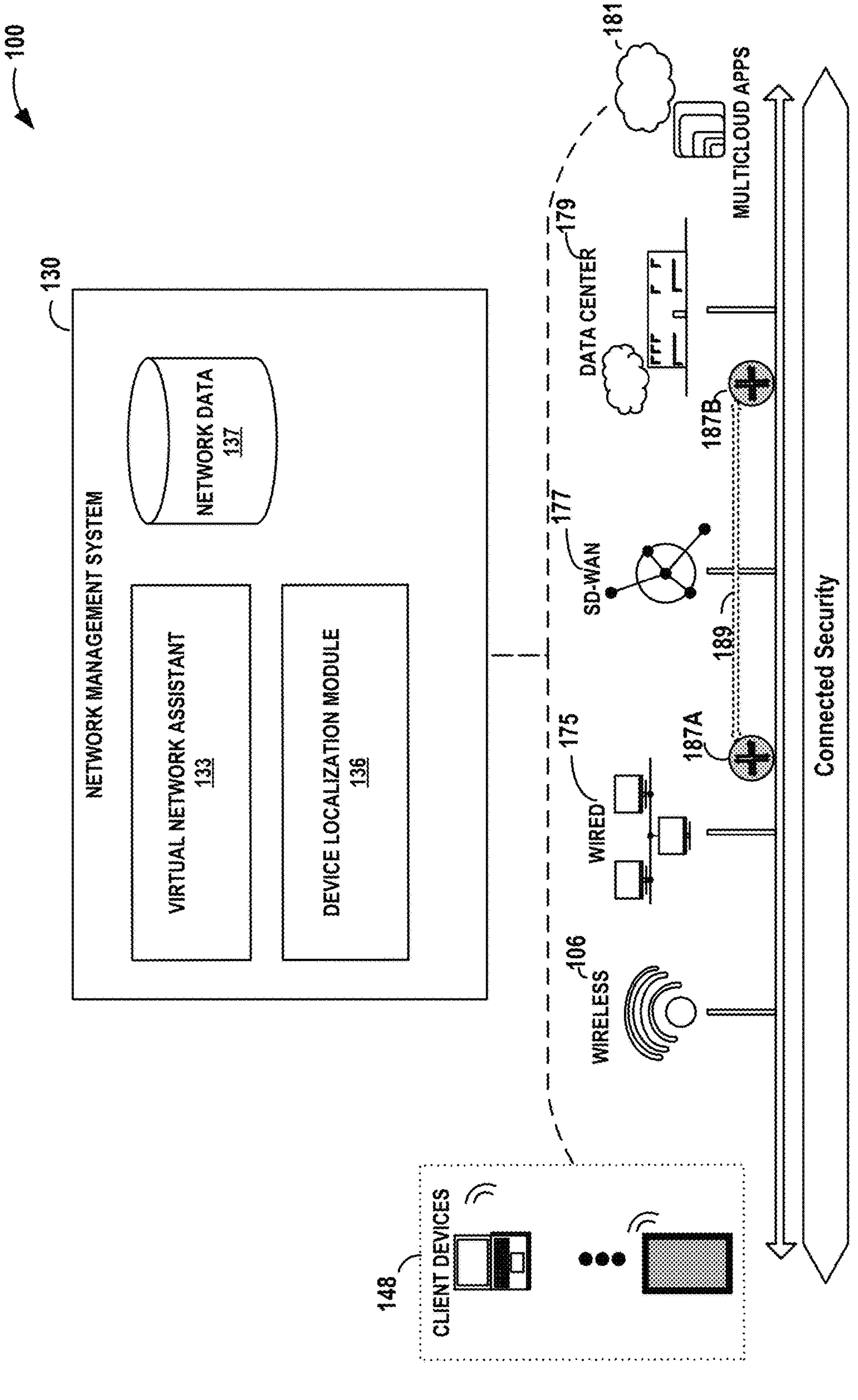
FIG. 1B is a block diagram illustrating further example details of the network system of FIG. 1A.

FIG. 1B is a block diagram illustrating further example details of the network system of FIG. 1A. In this example, FIG. 1B illustrates NMS 130 configured to operate according to an artificial intelligence/machine-learning-based computing platform providing comprehensive automation, insight, and assurance (WiFi Assurance, Wired Assurance and WAN assurance) spanning from "client," e.g., user devices 148 connected to wireless network 106 and wired LAN 175 (far left of FIG. 1B), to "cloud," e.g., cloud-based application services 181 that may be hosted by computing resources within data centers 179 (far right of FIG. 1B).

As described herein, NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, and alert generation. For example, network management system 130 may be configured to proactively monitor and adaptively configure network 100 so as to provide self-driving capabilities. Moreover, VNA 133 includes a natural language processing engine to provide AI-driven support and troubleshooting, anomaly detection, AI-driven location services, and AI-driven radio frequency (RF) optimization with reinforcement learning.

As illustrated in the example of FIG. 1B, AI-driven NMS 130 also provides configuration management, monitoring and automated oversight of software defined wide-area network (SD-WAN) 177, which operates as an intermediate network communicatively coupling wireless networks 106 and wired LANs 175 to data centers 179 and application services 181. In general, SD-WAN 177 provides seamless, secure, traffic-engineered connectivity between "spoke" routers 187A of wired networks 175 hosting wireless networks 106, such as branch or campus networks, to "hub" routers 187B further up the cloud stack toward cloud-based application services 181. SD-WAN 177 often operates and manages an overlay network on an underlying physical Wide-Area Network (WAN), which provides connectivity to geographically separate customer networks. In other words, SD-WAN 177 extends Software-Defined Networking (SDN) capabilities to a WAN and allows network(s) to decouple underlying physical network infrastructure from virtualized network infrastructure and applications such that the networks may be configured and managed in a flexible and scalable manner.

In some examples, underlying routers of SD-WAN 177 may implement a stateful, session-based routing scheme in which the routers 187A, 187B dynamically modify contents of original packet headers sourced by client devices 148 to steer traffic along selected paths, e.g., path 189, toward application services 181 without requiring use of tunnels and/or additional labels. In this way, routers 187A, 187B may be more efficient and scalable for large networks since the use of tunnel-less, session-based routing may enable routers 187A, 187B to achieve considerable network resources by obviating the need to perform encapsulation and decapsulation at tunnel endpoints. Moreover, in some examples, each router 187A, 187B may independently perform path selection and traffic engineering to control packet flows associated with each session without requiring use of a centralized SDN controller for path selection and label distribution. In some examples, routers 187A, 187B implement session-based routing as Secure Vector Routing (SVR), provided by Juniper Networks, Inc.

Additional information with respect to session-based routing and SVR is described in U.S. Pat. No. 9,729,439, entitled "COMPUTER NETWORK PACKET FLOW CONTROLLER," and issued on Aug. 8, 2017; U.S. Pat. No. 9,729,682, entitled "NETWORK DEVICE AND METHOD FOR PROCESSING A SESSION USING A PACKET SIGNATURE," and issued on Aug. 8, 2017; U.S. Pat. No. 9,762,485, entitled "NETWORK PACKET FLOW CONTROLLER WITH EXTENDED SESSION MANAGEMENT," and issued on Sep. 12, 2017; U.S. Pat. No. 9,871,748, entitled "ROUTER WITH OPTIMIZED STATISTICAL FUNCTIONALITY," and issued on Jan. 16, 2018; U.S. Pat. No. 9,985,883, entitled "NAME-BASED ROUTING SYSTEM AND METHOD," and issued on May 29, 2018; U.S. Pat. No. 10,200,264, entitled "LINK STATUS MONITORING BASED ON PACKET LOSS DETECTION," and issued on Feb. 5, 2019; U.S. Pat. No. 10,277,506, entitled "STATEFUL LOAD BALANCING IN A STATELESS NETWORK," and issued on Apr. 30, 2019; U.S. Pat. No. 10,432,522, entitled "NETWORK PACKET FLOW CONTROLLER WITH EXTENDED SESSION MANAGEMENT," and issued on Oct. 1, 2019; and U.S. Pat. No. 11,075,824, entitled "IN-LINE PERFORMANCE MONITORING," and issued on Jul. 27, 2021, the entire content of each of which is incorporated herein by reference in its entirety.

In some examples, AI-driven NMS 130 may enable intent-based configuration and management of network system 100, including enabling construction, presentation, and execution of intent-driven workflows for configuring and managing devices associated with wireless networks 106, wired LAN networks 175, and/or SD-WAN 177. For example, declarative requirements express a desired configuration of network components without specifying an exact native device configuration and control flow. By utilizing declarative requirements, what should be accomplished may be specified rather than how it should be accomplished. Declarative requirements may be contrasted with imperative instructions that describe the exact device configuration syntax and control flow to achieve the configuration. By utilizing declarative requirements rather than imperative instructions, a user and/or user system is relieved of the burden of determining the exact device configurations required to achieve a desired result of the user/system. For example, it is often difficult and burdensome to specify and manage exact imperative instructions to configure each device of a network when various different types of devices from different vendors are utilized. The types and kinds of devices of the network may dynamically change as new devices are added and device failures occur. Managing various different types of devices from different vendors with different configuration protocols, syntax, and software versions to configure a cohesive network of devices is often difficult to achieve. Thus, by only requiring a user/system to specify declarative requirements that specify a desired result applicable across various different types of devices, management and configuration of the network devices becomes more efficient. Further example details and techniques of an intent-based network management system are described in U.S. Pat. No. 10,756,983, entitled "Intent-based Analytics," and U.S. Pat. No. 10,992,543, entitled "Automatically generating an intent-based network model of an existing computer network," each of which is hereby incorporated by reference.

In accordance with the techniques described in this disclosure, NMS 130 may obtain distance measurement between at least two devices. NMS 130 may obtain distance measurements between, for example, a target device positioned at an unknown location and at least one reference device positioned at a known location. The target device may include a client device 148 or a device in wireless network 106, such as an access point (e.g., AP 142 of FIG. 1A) or other device configured to exchange wireless signals used to determine the distance between devices. The at least one reference device may include a device in wireless network 106. Although described with respect to devices in wireless network 106, the target device and/or reference device may include devices configured to exchange wireless signals in other networks.

NMS 130 may determine the location of the target device based on distance measurements between the target device and the at one reference device. For example, NMS 130 may obtain the distance measurements from the target device, the reference device, and/or other devices connected to the target device or the reference device, such as from network devices in wired network 175, SD-WAN 177, and/or from cloud-based application services 181 that may be hosted by computing resources within data centers 179 (far right of FIG. 1B) that are communicatively coupled to the target device or the reference device. Based on the obtained distance measurements, NMS 130 may apply a localization algorithm, such as multilateration techniques, to determine possible positions of the target device.

NMS 130 may eliminate possible positions based on directional information specifying, for example, a direction of a signal (e.g., BLE signal) communicated between an antenna of the target device and an antenna of the reference device. For example, NMS 130 may obtain directional information of signals communicated in accordance with personal area network communication protocols implemented in wireless network 106, such as Bluetooth/Bluetooth Low Energy (BLE) or other communication protocols that may include directional information of communicated signals. In some examples, NMS 130 may obtain the directional information from the target device, the reference device, and/or other devices connected to the target device or the reference device, such as from network devices in wired network 175, SD-WAN 177, and/or from cloud-based application services 181 that may be hosted by computing resources within data centers 179 (far right of FIG. 1B) that are communicatively coupled to the target device or the reference device. NMS 130 may determine a candidate position of the target network device based on the directional information. For example, NMS 130 may eliminate possible positions of the target device based on directional information that specifies a direction of the signal communicated between the target device and the reference device is inconsistent with an expected direction of the signal.

Figure 2:
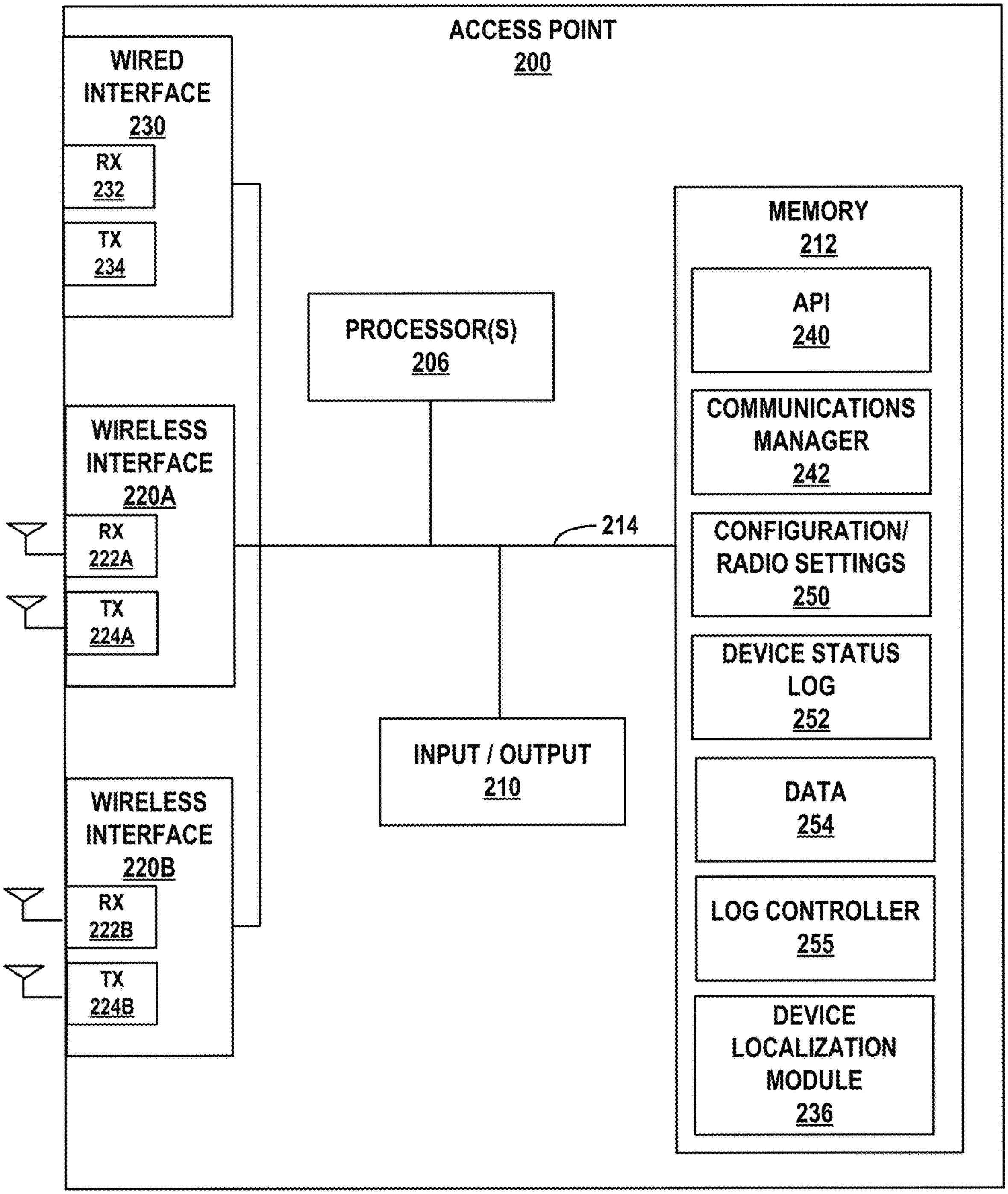
FIG. 2 is a block diagram of an example access point device, in accordance with one or more techniques of this disclosure.

FIG. 2 is a block diagram of an example access point (AP) device 200, in accordance with one or more techniques of this disclosure. Example access point 200 and device localization module 236 shown in FIG. 2 may be used to implement any of APs 142 of FIG. 1A and at least part of the functionality of device localization module 136, respectively, as shown and described herein with respect to FIG. 1A.

In the example of FIG. 2, access point 200 includes a wired interface 230, wireless interfaces 220A-220B, one or more processor(s) 206, memory 212, and input/output 210, coupled together via a bus 214 over which the various elements may exchange data and information. Wired interface 230 represents a physical network interface and includes a receiver 232 and a transmitter 234 for sending and receiving network communications, e.g., packets. Wired interface 230 couples, either directly or indirectly, access point 200 to a wired network device, such as one of switches 146 of FIG. 1A, within the wired network via a cable, such as an Ethernet cable.

First and second wireless interfaces 220A and 220B represent wireless network interfaces and include receivers 222A and 222B, respectively, each including a receive antenna via which access point 200 may receive wireless signals from wireless communications devices, such as UEs 148 or other APs 142 of FIG. 1A. First and second wireless interfaces 220A and 220B further include transmitters 224A and 224B, respectively, each including transmit antennas via which access point 200 may transmit wireless signals to wireless communications devices, such as UEs 148 or other APs 142 of FIG. 1A. In some examples, first wireless interface 220A may implement a first communication protocol, such as WI-FI 802.11 (e.g., 2.4 GHz and/or 5 GHZ), and second wireless interface 220B may implement a second communication protocol, such as BLUETOOTH and/or a BLUETOOTH Low Energy (BLE).

Processor(s) 206 are programmable hardware-based processors configured to execute software instructions, such as those used to define a software or computer program, stored to a computer-readable storage medium (such as memory 212), such as non-transitory computer-readable mediums including a storage device (e.g., a disk drive, or an optical drive) or a memory (such as Flash memory or RAM) or any other type of volatile or non-volatile memory, that stores instructions to cause the one or more processors 206 to perform the techniques described herein.

Memory 212 includes one or more devices configured to store programming modules and/or data associated with operation of access point 200. For example, memory 212 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 206 to perform the techniques described herein.

In this example, memory 212 stores executable software including an application programming interface (API) 240, a communications manager 242, configuration settings 250, a device status log 252, data storage 254, log controller 255, and device localization module 236. Device status log 252 includes a list of events specific to access point 200. The events may include a log of both normal events and error events such as, for example, memory status, reboot or restart events, crash events, cloud disconnect with self-recovery events, low link speed or link speed flapping events, Ethernet port status, Ethernet interface packet errors, upgrade failure events, firmware upgrade events, configuration changes, etc., as well as a time and date stamp for each event. Log controller 255 determines a logging level for the device based on instructions from NMS 130. Data 254 may store any data used and/or generated by access point 200, including data collected from UEs 148, such as data used to calculate one or more SLE metrics, that is transmitted by access point 200 for cloud-based management of wireless networks 106A by NMS 130. Device localization module 236 may include computer readable instructions for determining distance measurements, as well as directional information, between access point 200 and another device in communication with access point 200 (a reference or target device) to determine the location of access point 200 or the other device in communication with access point 200, as further described below.

Input/output (I/O) 210 represents physical hardware components that enable interaction with a user, such as buttons, a display, and the like. Although not shown, memory 212 typically stores executable software for controlling a user interface with respect to input received via I/O 210. Communications manager 242 includes program code that, when executed by processor(s) 206, allow access point 200 to communicate with UEs 148 and/or network(s) 134 via any of interface(s) 230 and/or 220A-220B. Configuration settings 250 include any device settings for access point 200 such as radio settings for each of wireless interface(s) 220A-220B. These settings may be configured manually or may be remotely monitored and managed by NMS 130 to optimize wireless network performance on a periodic (e.g., hourly or daily) basis.

As described herein, AP device 200 may measure and report network data from status log 252 to NMS 130. The network data may comprise event data, telemetry data, and/or other SLE-related data. The network data may include various parameters indicative of the performance and/or status of the wireless network. The parameters may be measured and/or determined by one or more of the UE devices and/or by one or more of the APs in a wireless network. NMS 130 may determine one or more SLE metrics based on the SLE-related data received from the APs in the wireless network and store the SLE metrics as network data 137 (FIG. 1A).

In accordance with the techniques described herein, access point 200 may, in some examples, include device localization module 236 that is configured to determine the location of access point 200 or another device in communication with access point 200 based on directional information of signals communicated between the access point 200 and the other device in communication with access point 200. In instances where access point 200 operates as a reference device to a target device, device localization module 236 may instruct wireless interfaces 220A, for example, to send a wireless signal (e.g., a Wi-Fi signal) to the target device and determine a distance between access point 200 and the target device. Device localization module 236 may determine the distance between access point 200 and the target device based on distance measurements determined in accordance with FTM protocols described in IEEE 802.11-2016. For example, device localization module 236 may perform a two-way ToF estimation of the wireless signals communicated between access point 200 and the target device. Device localization module 236 may implement a localization algorithm, such as multilateration techniques, using the distance measurements to determine possible positions of the target device. For example, device localization module 236 may plot possible positions of the target device based on a probability distribution function, and determine whether the distribution forms a multimodal distribution (where there is more than one local maxima in the distribution), which may indicate a plurality of possible positions of the target device relative to access point 200.

In response to determining a plurality of possible positions of the target device, device localization module 236 may obtain directional information specifying a direction of wireless signals communicated between access point 200 and the target device. For example, device localization module 236 may determine a direction a wireless signal is communicated between access point 200 and the target device. Device localization module 236 may, for example, determine the direction of the wireless signal based on a direction in which wireless interface 220B, or more specifically a receive antenna of receiver 222B, receives the strongest directional beam signals originating from the target device.

In operation, device localization module 236 may, based on the directional information, determine whether there are any localization errors in an expected direction of a target device relative to AP 200. Device localization module 236 may determine discrepancies between directional information specifying a direction of wireless signals communicated between access point 200 and the target device and an expected direction of the target device location (e.g., determined based on distance measurements between the target device and access point 200). For example, device localization module 236 may determine whether directional information of a target device relative to AP 200 is inconsistent with a relative direction the target device is located to AP 200. Device localization module 236 may generate a flag or other value that indicates a determined discrepancy in direction of the target device relative to AP 200. For example, device localization module 236 may obtain directional information specifying a first direction of a BLE signal communicated between wireless interface 220B and a wireless interface of a target device, and compare the first direction to a second direction indicative of a relative direction the target device is located with respect to AP 200. Device localization module 236 may determine the first direction is inconsistent with the second direction and may generate a flag that indicates a discrepancy in the direction of the target device relative to AP 200.

In some instances, device localization module 236 may alternatively or additionally determine a localization error by identifying whether a distribution of possible positions of the target device form a multimodal distribution. For example, device localization module 236 may generate a density plot based on the distance measurements (e.g., using a probability density function) between AP 200 and a target device. Device localization module 236 may identify, for example, local maxima in the density plot that may be indicative of a possible position of the target device. If device localization module 236 identifies more than one local maxima in the density plot, device localization module 236 may determine the distribution of distance measurements between AP 200 and the target device is multimodal. Device localization module 236, responsive to determining the distribution is multimodal, may determine that there may be an error in the determined location of the target device, such as the target device having two or more possible positions.

In response to device localization module 236 determining an error in the expected location of the target device, device localization module 236 may resolve any ambiguity in the plurality of possible positions of the target device based on the directional information. For example, device localization module 236 may determine, from the directional information of a BLE signal communicated between an antenna of wireless interface 220B and an antenna of a target device, a candidate position of the target device from among two or more possible positions of the target device. For example, device localization module 236 may determine the candidate position of the target device based on an error bias applied to possible positions in the multimodal distribution specifying likelihoods of possible positions of the target device. In these examples, device localization module 236 may add an error bias to a possible position of the target device in the multimodal distribution in which a direction specified in directional information of signals communicated between AP 200 and the target device deviate from a direction of a possible position of the target device determined from distance measurements to reduce the multi-modal distribution to a single candidate position corresponding to a direction specified in the directional information. Device localization module 236 may send the candidate position to a network management system (e.g., NMS 130 of FIG. 1A) to place the target device relative to access point 200 on a site map of a site. In instances where access point 200 is a target device, access point 200 may operate substantially similar to the access point operating as a reference device, as described above.

In some instances, access point 200 may determine a target device may be an isolated target device (e.g., a device having two or fewer reference devices are available to determine the location and/or orientation of the target device based on distance measurements). For example, device localization module 236 may determine that there are less than three distance measurements for the target device and may flag the target device as an isolated target device that has a limited amount of data to triangulate the location of the target device. Device localization module 236 may determine a candidate position of the isolated target based on the distance measurements, for example, by adding error biases to possible positions of the target device in the multimodal distribution in which the positional direction of the target device deviates from the direction of the BLE signal.

In some examples in which there is only one reference device to perform distance measurements, device localization module 236 may determine a probability window (e.g., a tight area representing possible locations of access point 200) of a candidate position. For example, device localization module 236 may determine a large probability band of possible positions of the target device based on distance measurements between the target device and the single reference device. Device localization module 236 may refine the probability band of possible positions to a probability window of a most likely position of the target device. For example, device localization module 236 may determine the probability window of a candidate position based on directional information of BLE signals communicated between one or more other devices and the target device, where the target device is not in range of the Wi-Fi signals of the one or more other devices.

Figure 3:
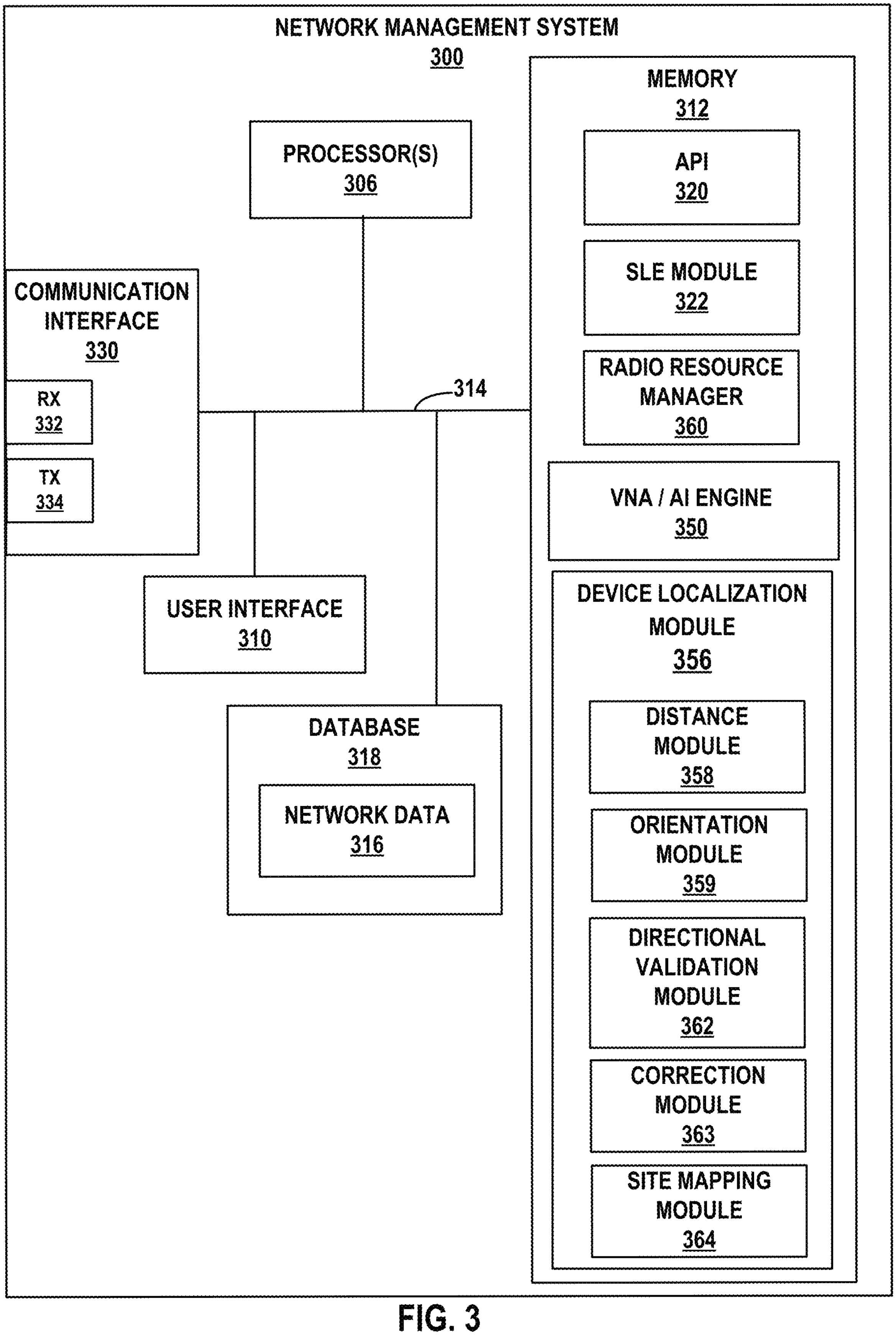
FIG. 3 is a block diagram of an example network management system, in accordance with one or more techniques of the disclosure.

FIG. 3 are block diagrams of an example network management system (NMS) 300, in accordance with one or more techniques of the disclosure. NMS 300 may be used to implement, for example, NMS 130 in FIGS. 1A-1B. In such examples, NMS 300 is responsible for monitoring and management of one or more wireless networks 106A-106N at sites 102A-102N, respectively.

NMS 300 includes a communications interface 330, one or more processor(s) 306, a user interface 310, a memory 312, and a database 318. The various elements are coupled together via a bus 314 over which the various elements may exchange data and information. In some examples, NMS 300 receives data from one or more of client devices 148, APs 142, switches 146 and other network nodes within network 134, e.g., routers 187 of FIG. 1B, which may be used to calculate one or more SLE metrics and/or update network data 316 in database 318. NMS 300 analyzes this data for cloud-based management of wireless networks 106A-106N. In some examples, NMS 300 may be part of another server shown in FIG. 1A or a part of any other server.

Processor(s) 306 execute software instructions, such as those used to define a software or computer program, stored to a computer-readable storage medium (such as memory 312), such as non-transitory computer-readable mediums including a storage device (e.g., a disk drive, or an optical drive) or a memory (such as Flash memory or RAM) or any other type of volatile or non-volatile memory, that stores instructions to cause the one or more processors 306 to perform the techniques described herein.

Communications interface 330 may include, for example, an Ethernet interface. Communications interface 330 couples NMS 300 to a network and/or the Internet, such as any of network(s) 134 as shown in FIG. 1A, and/or any local area networks.

Communications interface 330 includes a receiver 332 and a transmitter 334 by which NMS 300 receives/transmits data and information to/from any of client devices 148, APs 142, switches 146, servers 110, 116, 122, 128 and/or any other network nodes, devices, or systems forming part of network system 100 such as shown in FIG. 1A. In some scenarios described herein in which network system 100 includes “third-party” network devices that are owned and/or associated with different entities than NMS 300, NMS 300 does not receive, collect, or otherwise have access to network data from the third-party network devices.

The data and information received by NMS 300 may include, for example, telemetry data, SLE-related data, or event data received from one or more of client device APs 148, APs 142, switches 146, or other network nodes, e.g., routers 187 of FIG. 1B, used by NMS 300 to remotely monitor the performance of wireless networks 106A-106N and application sessions from client device to cloud-based application server. NMS 300 may further transmit data via communications interface 330 to any of network devices such as client devices 148, APs 142, switches 146, other network nodes within network 134, admin device 111 to remotely manage wireless networks 106A-106N and portions of the wired network.

Memory 312 includes one or more devices configured to store programming modules and/or data associated with operation of NMS 300. For example, memory 312 may include a computer-readable storage medium, such as a non-transitory computer-readable medium including a storage device (e.g., a disk drive, or an optical drive) or a memory (such as Flash memory or RAM) or any other type of volatile or non-volatile memory, that stores instructions to cause the one or more processor(s) 306 to perform the techniques described herein.

In this example, memory 312 includes an API 320, an SLE module 322, a virtual network assistant (VNA)/AI engine 350, a radio resource management (RRM) engine 360, and device localization module 356. NMS 300 may also include any other programmed modules, software engines and/or interfaces configured for remote monitoring and management of wireless networks 106A-106N and portions of the wired network, including remote monitoring and management of any of APs 142/200, switches 146, or other network devices, e.g., routers 187 of FIG. 1B.

SLE module 322 enables set up and tracking of thresholds for SLE metrics for each network 106A-106N. SLE module 322 further analyzes SLE-related data collected by APs, such as any of APs 142 from UEs in each wireless network 106A-106N. For example, APs 142A-1 through 142A-N collect SLE-related data from UEs 148A-1 through 148A-N currently connected to wireless network 106A. This data is transmitted to NMS 300, which executes by SLE module 322 to determine one or more SLE metrics for each UE 148A-1 through 148A-N currently connected to wireless network 106A. This data, in addition to any network data collected by one or more APs 142A-1 through 142A-N in wireless network 106A, is transmitted to NMS 300 and stored as, for example, network data 316 in database 318.

RRM engine 360 monitors one or more metrics for each site 102A-102N in order to learn and optimize the RF environment at each site. For example, RRM engine 360 may monitor the coverage and capacity SLE metrics for a wireless network 106 at a site 102 in order to identify potential issues with SLE coverage and/or capacity in the wireless network 106 and to make adjustments to the radio settings of the access points at each site to address the identified issues. For example, RRM engine may determine channel and transmit power distribution across all APs 142 in each network 106A-106N. For example, RRM engine 360 may monitor events, power, channel, bandwidth, and number of clients connected to each AP. RRM engine 360 may further automatically change or update configurations of one or more APs 142 at a site 102 with an aim to improve the coverage and capacity SLE metrics and thus to provide an improved wireless experience for the user.

VNA/AI engine 350 analyzes data received from network devices as well as its own data to identify when undesired to abnormal states are encountered at one of the network devices. For example, VNA/AI engine 350 may identify the root cause of any undesired or abnormal states, e.g., any poor SLE metric(s) indicative of connected issues at one or more network devices. In addition, VNA/AI engine 350 may automatically invoke one or more corrective actions intended to address the identified root cause(s) of one or more poor SLE metrics. Examples of corrective actions that may be automatically invoked by VNA/AI engine 350 may include, but are not limited to, invoking RRM 360 to reboot one or more APs, adjusting/modifying the transmit power of a specific radio in a specific AP, adding SSID configuration to a specific AP, changing channels on an AP or a set of APs, etc. The corrective actions may further include restarting a switch and/or a router, invoking downloading of new software to an AP, switch, or router, etc. These corrective actions are given for example purposes only, and the disclosure is not limited in this respect. If automatic corrective actions are not available or do not adequately resolve the root cause, VNA/AI engine 350 may proactively provide a notification including recommended corrective actions to be taken by IT personnel, e.g., a site or network administrator using admin device 111, to address the network error.

Device localization module 356 may determine a position of a target network device. Device localization module 356 may include an example or alternative implementation of device localization module 236 of FIG. 2. For example, device localization module 356 may determine distance measurements between a target device and at least one reference device according to an FTM protocol (e.g., by receiving RTT data from the at least one reference device and/or the target device). Device localization module 356 may also obtain directional information of signals communicated between the target device and the at least one reference device. Device localization module 356 may determine two or more possible positions of the target device based on the distance measurements and directional information (e.g., by determining an expected direction of the target device relative to the at least one reference device is inconsistent with the directional information). Device localization module 356 may determine a candidate position from the two or more possible positions based on the directional information.

In the example of FIG. 3, device localization module 356 may include distance module 358, orientation module 359, directional validation module 362, correction module 363, and site mapping module 364. Distance module 358 may obtain distance measurements between a target device positioned at an unknown location within a site and one or more reference devices positioned at known locations within the site. Distance module 358 may determine an approximate location of a target device based on distance measurements between the target device and one or more reference devices. Orientation module 359 may obtain received signal strength measurements of wireless signals originating at one or more antennas of a target device and received by one or more antennas of a reference device, or vice versa. Orientation module 359 may determine an orientation angle a target device is located relative to a reference device based on the received signal strength measurements, for example. Directional validation module 362 may obtain directional information of signals communicated between a target device and one or more reference devices. Directional validation module 362 may determine discrepancies between an orientation of a target device, as determined by orientation module 359, for example, and the directional information. Correction module 363 may determine, based on the directional information, a candidate position to correct any discrepancies. Site map module 364 may generate a map including relative locations of the target device and the one or more reference devices based on the known locations of the one or more reference devices, as well as the candidate position of the target device.

Distance module 358 may determine a location of a target device at a site based on distance measurements between the target device and one or more reference devices. For example, distance module 358 may obtain distance measurements determined based on RTT measurements of wireless signals exchanged between the target device and one or more reference devices. Distance module 358 may implement a localization algorithm (e.g., multilateration techniques) to determine one or more possible positions of the target device based on the distance measurements specifying a distance the target device is located relative to one or more reference devices. In general, distance module 358 may determine possible positions of any device at a site based on distance measurements between the devices at the site.

Orientation module 359 may determine an orientation (e.g., rotational position of a device at a site relative to other devices) of a target device based on the distance measurements. For example, orientation module 359 may obtain distance measurements determined based on received signal strength measurements of wireless signals transmitted by one or more antennas of a reference device and received by one or more antennas of a target device, or vice versa. Orientation module 359 may determine the orientation of the target device based on an orientation angle, included in the distance measurements, specifying a rotational position a target device is located relative to a reference device. In some examples, orientation module 359 may determine the orientation of a target device based on orientation angles of reference devices with known positions at a site. Orientation module 359 may determine the orientation of a target device as an indication of a rotational direction a target device is located relative to one or more reference devices. Orientation module 359 may obtain the one or more possible positions of the target device determined by distance module 358. Orientation module 359 may adjust the possible positions of the target device based on the determined orientation.

Directional validation module 362 may determine discrepancies between an expected location of a target device and directional information of wireless signals communicated between the target device and one or more reference devices. Directional validation module 362 obtain directional information of signals communicated between a target device and at least one reference device at a site. For example, directional validation module 362 may obtain directional information from a target device and/or reference devices that includes a direction the target device is located relative to the reference devices based on a BLE signal communicated between the target device and the reference devices. Directional validation module 362 may collect directional information between devices at a site in parallel, or at the same time as, distance module 358 and/or orientation module 359 collect distance measurements between devices at the site. Directional validation module 362 may check for discrepancies between expected directions the target device is located relative to reference devices and directional information of signals communicated between the target device and the reference devices. For example, directional validation module 362 may determine an expected direction a target device is located relative to a reference device based on possible positions of the target device determined by distance module 358 and/or orientation module 359. Directional validation module 362 may flag a discrepancy in response to determining the expected direction of the target device relative to the reference device is inconsistent with the directional information between the target device and the reference device. For example, directional information module 362 may flag discrepancies, such as when an expected direction of a target device relative to a reference device is inconsistent by at least 45 degrees compared to directional information of signals communicated between the target device and the reference device. Directional validation module 362 may flag multiple discrepancies by determining multiple inconsistencies with expected directions of the target device and multiple devices is consistent with corresponding directional information. Directional validation module 362 may determine a localization error (e.g., the target device located at two or more possible positions) based on the number of flagged discrepancies for a target device satisfying a threshold. In response to determining a localization error, directional validation module 362 may relay an indication of the localization error (e.g., two or more possible positions of a target device) and the directional information to correction module 363.

Correction module 363 may correct a localization error based on the directional information. Correction module 363 may determine a candidate position from two or more possible positions (e.g., as indicated in a localization error) of a target device based on the directional information. In some instances, correction module 363 may select a candidate position of the two or more possible positions based on a possible position that is consistent with the directional information. In some examples, correction module 363 may eliminate possible positions from the two or more possible positions based on a possible position being inconsistent with the directional information. If correction module 363 determines more than one candidate position is not inconsistent with the directional information, correction module 363 may re-determine whether the more than one candidate position results in a discrepancy when compared to directional information associated with the target device and one or more additional reference devices. For example, correction module 363 may obtain additional directional information of signals communicated between the target device and another reference device that may be on a different level at the site (e.g., above or below the candidate position).

Additionally, or alternatively, directional validation module 362 may generate a density plot of possible positions. In some instances, directional validation module 362 may generate the density plot of possible positions based on distance measurements obtained by distance module 358 and/or orientation module 359. Directional validation module 362 may determine the density plot is multimodal. In other words, directional validation module 362 may determine the more than one local maxima in the density plot of possible positions. Directional validation module 362 may add error biases to the density plot of possible positions based on the directional information of signals communicated between the target device and at least one reference device. Directional validation module 362 may send the density plot of possible positions with the applied error biases to correction module 363. Correction module 363 may determine a candidate position based on the density plot of possible positions with the error biases. For example, correction module 363 may determine a candidate position by eliminating possible positions on the density plot based on a degree of an error bias applied to the possible positions. Correction module 363 may send the candidate position to site mapping module 364. Site mapping module 364 may place a user interface element (e.g., a computer-generated icon representing a device) indicating a location of the target device on a site map based on the candidate position.

In some examples, directional validation module 362 may flag a target device as an isolated device. Directional validation module 362 may determine a target device is an isolated device when the target device is associated with fewer than three reference devices. Directional validation module 362 may determine an isolated target device has an inherent localization error as a result of the scarcity of data available to determine the location of a target device. For example, directional validation module 362 may determine that there are less than three distance measurements for the target device and may flag the target device as an isolated target device that has a limited amount of data to triangulate the location of the target device. In this example, directional validation module 362 may obtain directional information between the target device and other devices that may be proximate to a possible position of the target device but is isolated from the target device in terms of being unable to communicate with the target device to determine distance measurements. Directional validation module 362 may provide the directional information to correction module 363. Correction module 362 may eliminate possible positions of a target device and/or refine a location of the target device to a probability window of where the target device is likely located based on the directional information.

The techniques of this disclosure provide one or more technical advantages and practical applications. For example, NMS 300 utilizes a new dimension of data (e.g., directional information obtained based on directional signals sent and received by a target device and/or one or more reference devices) to validate and/or further refine placement of a target device on a site map. NMS 300 may obtain directional information to disambiguate possible positions of a target device that may be associated with two or more equidistant points relative to one or more reference devices on a site map. NMS 300 may disambiguate possible positions by eliminating at least one of these possible positions based on inconsistencies of expected directions the target device is located relative to reference devices and corresponding directional information. NMS 300 may bolster sparse FTM data in fringe sections of the map. NMS 300 may use the directional information to add a degree of validity to fewer amounts of distance measurements. In this way, NMS 300 may apply the directional information to allow for more accurate localizations of devices with less known positions (e.g., a fewer number of reference devices). In general, NMS 300 may rely on directional information of signals communicated between devices at a site as a reliable source of information, compared to locations of devices determined based on distance measurements.

Although the techniques of the present disclosure are described in this example as performed by NMS 130, techniques described herein may be performed by any other computing device(s), system(s), and/or server(s), and that the disclosure is not limited in this respect. For example, one or more computing device(s) configured to execute the functionality of the techniques of this disclosure may reside in a dedicated server or be included in any other server in addition to or other than NMS 130, or may be distributed throughout network 100, and may or may not form a part of NMS 130.

Figure 4:
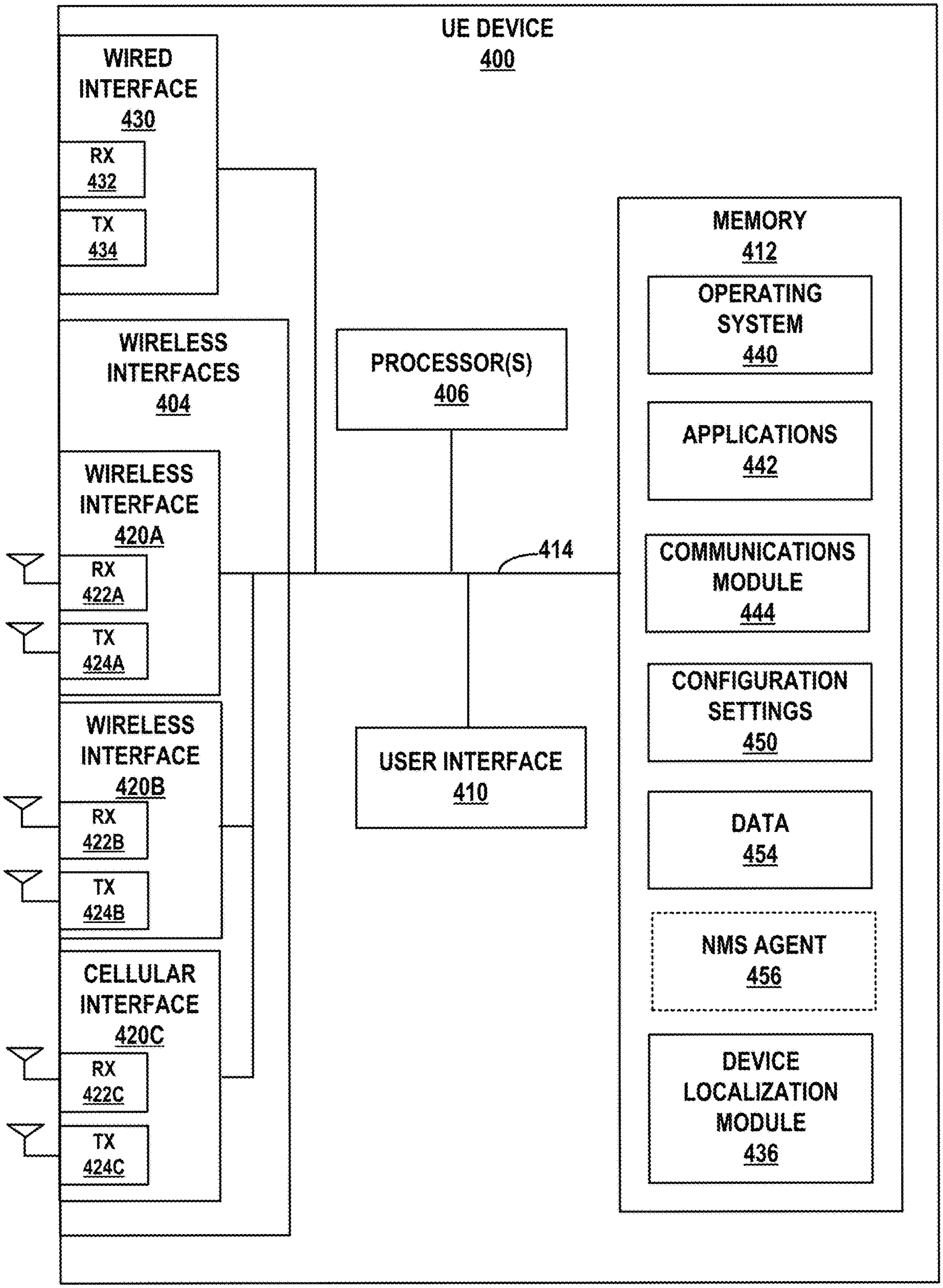
FIG. 4 is a block diagram of an example user equipment device, in accordance with one or more techniques of this disclosure.

FIG. 4 shows an example user equipment (UE) device 400, in accordance with one or more techniques of this disclosure. Example UE device 400 and device localization module 436 shown in FIG. 4 may be used to implement any of UEs 148 and device localization module 134, respectively, as shown and described herein with respect to FIG. 1A. UE device 400 may include any type of wireless client device, and the disclosure is not limited in this respect. For example, UE device 400 may include a mobile device such as a smart phone, tablet or laptop computer, a personal digital assistant (PDA), a wireless terminal, a smart watch, a smart ring, or any other type of mobile or wearable device. In some examples, UE 400 may also include a wired client-side device, e.g., an IoT device such as a printer, a security sensor or device, an environmental sensor, or any other device connected to the wired network and configured to communicate over one or more wireless networks.

UE device 400 includes a wired interface 430, wireless interfaces 420A-420C, one or more processor(s) 406, memory 412, and a user interface 410. The various elements are coupled together via a bus 414 over which the various elements may exchange data and information. Wired interface 430 represents a physical network interface and includes a receiver 432 and a transmitter 434. Wired interface 430 may be used, if desired, to couple, either directly or indirectly, UE 400 to a wired network device, such as one of switches 146 of FIG. 1A, within the wired network via a cable, such as one of Ethernet cables 144 of FIG. 1A.

First, second and third wireless interfaces 420A, 420B, and 420C include receivers 422A, 422B, and 422C, respectively, each including a receive antenna via which UE 400 may receive wireless signals from wireless communications devices, such as APs 142 of FIG. 1A, AP 200 of FIG. 2, other UEs 148, or other devices configured for wireless communication. First, second, and third wireless interfaces 420A, 420B, and 420C further include transmitters 424A, 424B, and 424C, respectively, each including transmit antennas via which UE 400 may transmit wireless signals to wireless communications devices, such as APs 142 of FIG. 1A, AP 200 of FIG. 2, other UEs 148 and/or other devices configured for wireless communication. In some examples, first wireless interface 420A may include a Wi-Fi 802.11 interface (e.g., 2.4 GHz and/or 5 GHZ) and second wireless interface 420B may include a Bluetooth interface and/or a Bluetooth Low Energy interface. Third wireless interface 420C may include, for example, a cellular interface through which UE device 400 may connect to a cellular network.

Processor(s) 406 execute software instructions, such as those used to define a software or computer program, stored to a computer-readable storage medium (such as memory 412), such as non-transitory computer-readable mediums including a storage device (e.g., a disk drive, or an optical drive) or a memory (such as Flash memory or RAM) or any other type of volatile or non-volatile memory, that stores instructions to cause the one or more processors 406 to perform the techniques described herein.

Memory 412 includes one or more devices configured to store programming modules and/or data associated with operation of UE 400. For example, memory 412 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 406 to perform the techniques described herein.

In this example, memory 412 includes an operating system 440, applications 442, a communications module 444, configuration settings 450, data storage 454, and device localization module 436. Communications module 444 includes program code that, when executed by processor(s) 406, enables UE 400 to communicate using any of wired interface(s) 430, wireless interfaces 420A-420B and/or cellular interface 450C. Configuration settings 450 include any device settings for UE 400 settings for each of wireless interface(s) 420A-420B and/or cellular interface 420C.

Data storage 454 may include, for example, a status/error log including a list of events specific to UE 400. The events may include a log of both normal events and error events according to a logging level based on instructions from NMS 130. Data storage 454 may store any data used and/or generated by UE 400, such as data used to calculate one or more SLE metrics or identify relevant behavior data, that is collected by UE 400 and either transmitted directly to NMS 130 or transmitted to any of APs 142 in a wireless network 106 for further transmission to NMS 130.

As described herein, UE 400 may measure and report network data from data storage 454 to NMS 130. The network data may comprise event data, telemetry data, and/or other SLE-related data. The network data may include various parameters indicative of the performance and/or status of the wireless network. NMS 130 may determine one or more SLE metrics and store the SLE metrics as network data 137 (FIG. 1A) based on the SLE-related data received from the UEs or client devices in the wireless network.

Optionally, UE device 400 may include an NMS agent 456. NMS agent 456 is a software agent of NMS 130 that is installed on UE 400. In some examples, NMS agent 456 can be implemented as a software application running on UE 400. NMS agent 456 collects information including detailed client-device properties from UE 400, including insight into UE 400 roaming behaviors. The information provides insight into client roaming algorithms, because roaming is a client device decision. In some examples, NMS agent 456 may display the client-device properties on UE 400. NMS agent 456 sends the client device properties to NMS 130, via an AP device to which UE 400 is connected. NMS agent 456 can be integrated into a custom application or as part of location application. NMS agent 456 may be configured to recognize device connection types (e.g., cellular or Wi-Fi), along with the corresponding signal strength. For example, NMS agent 456 recognizes access point connections and their corresponding signal strengths. NMS agent 456 can store information specifying the APs recognized by UE 400 as well as their corresponding signal strengths. NMS agent 456 or other element of UE 400 also collects information about which APs the UE 400 connected with, which also indicates which APs the UE 400 did not connect with. NMS agent 456 of UE 400 sends this information to NMS 130 via its connected AP. In this manner, UE 400 sends information about not only the AP that UE 400 connected with, but also information about other APs that UE 400 recognized and did not connect with, and their signal strengths. The AP in turn forwards this information to the NMS, including the information about other APs the UE 400 recognized besides itself. This additional level of granularity enables NMS 130, and ultimately network administrators, to better determine the Wi-Fi experience directly from the client device's perspective.

In some examples, NMS agent 456 further enriches the client device data leveraged in service levels. For example, NMS agent 456 may go beyond basic fingerprinting to provide supplemental details into properties such as device type, manufacturer, and different versions of operating systems. In the detailed client properties, the NMS 130 can display the Radio Hardware and Firmware information of UE 400 received from NMS client agent 456. The more details the NMS agent 456 can draw out, the better the VNA/AI engine gets at advanced device classification. The VNA/AI engine of the NMS 130 continually learns and becomes more accurate in its ability to distinguish between device-specific issues or broad device issues, such as specifically identifying that a particular OS version is affecting certain clients.

In some examples, NMS agent 456 may cause user interface 410 to display a prompt that prompts an end user of UE 400 to enable location permissions before NMS agent 456 is able to report the device's location, client information, and network connection data to the NMS. NMS agent 456 will then start reporting connection data to the NMS along with location data. In this manner, the end user of the client device can control whether the NMS agent 456 is enabled to report client device information to the NMS.

In some examples, UE device 400 includes device localization module 436. UE device 400 may be configured to include device localization module 436 in examples where UE device 400 is a stationary UE device that an administrator would like to place on a map to suggest improvements to network coverage and/or to diagnose network issues. Device localization module 436 of UE device 400 may include an example or alternative implementation of device localization module 236 of FIG. 2 or device localization module 336 of FIG. 3.

Figure 5:
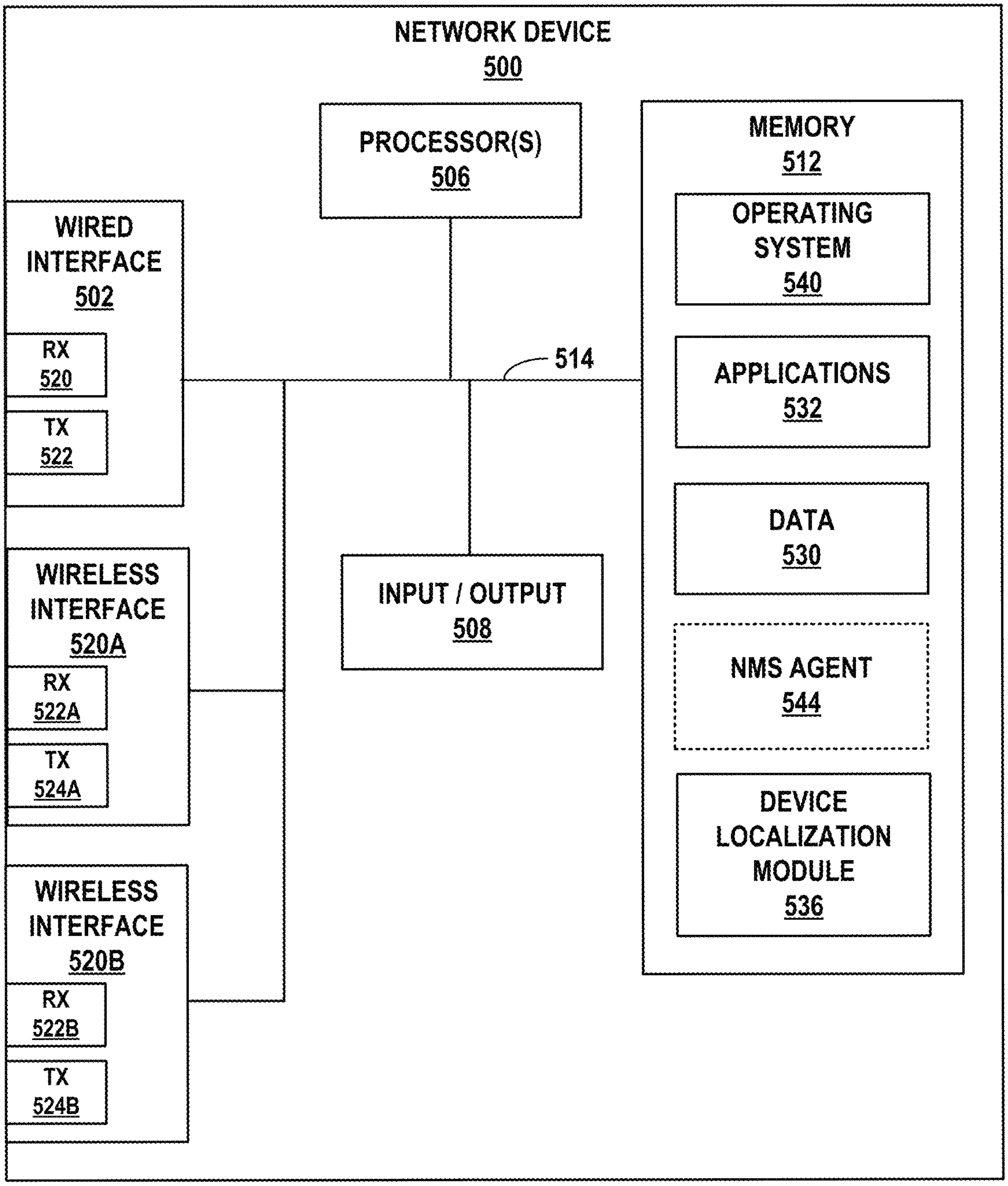
FIG. 5 is a block diagram of an example network device, such as a router or switch, in accordance with one or more techniques of this disclosure.

FIG. 5 is a block diagram illustrating an example network device 500, in accordance with one or more techniques of this disclosure. In one or more examples, the network device 500 implements a device or a server attached to the network 134 of FIG. 1A, e.g., switches 146, AAA server 110, DHCP server 116, DNS server 122, web servers 128, etc., or another network device supporting one or more of wireless network 106, wired LAN 175, or SD-WAN 177, or data center 179 of FIG. 1B, e.g., routers 187.

In this example, network device 500 includes a wired interface 502, e.g., an Ethernet interface, a processor 506, input/output 508, e.g., display, buttons, keyboard, keypad, touch screen, mouse, etc., wireless interfaces 520A and 520B, e.g., personal area network interface or local area network interface, etc., and a memory 512 coupled together via a bus 514 over which the various elements may interchange data and information. Wired interface 502 couples the network device 500 to a network, such as an enterprise network. Though only one interface is shown by way of example, network nodes may, and usually do, have multiple communication interfaces and/or multiple communication interface ports. Wired interface 502 includes a receiver 520 and a transmitter 522.

Memory 512 stores executable software applications 532, operating system 540 and data/information 530. Data 530 may include a system log and/or an error log that stores event data, including behavior data, for network device 500. In examples where network device 500 comprises a "third-party" network device, the same entity does not own or have access to both the APs or wired client-side devices and network device 500. As such, in the example where network device 500 is a third-party network device, NMS 130 does not receive, collect, or otherwise have access to the network data from network device 500.

In examples where network device 500 comprises a server, network device 500 may receive data and information, e.g., including operation related information, e.g., registration request, AAA services, DHCP requests, Simple Notification Service (SNS) look-ups, and Web page requests via receiver 520, and send data and information, e.g., including configuration information, authentication information, web page data, etc. via transmitter 522.

In examples where network device 500 comprises a wired network device, network device 500 may be connected via wired interface 502 to one or more APs or other wired client-side devices, e.g., IoT devices. For example, network device 500 may include multiple wired interfaces 502 and/or wired interface 502 may include multiple physical ports to connect to multiple APs or the other wired-client-side devices within a site via respective Ethernet cables. In some examples, each of the APs or other wired client-side devices connected to network device 500 may access the wired network via wired interface 502 of network device 500. In some examples, one or more of the APs or other wired client-side devices connected to network device 500 may each draw power from network device 500 via the respective Ethernet cable and a Power over Ethernet (POE) port of wired interface 502.

In examples where network device 500 comprises a session-based router that employs a stateful, session-based routing scheme, network device 500 may be configured to independently perform path selection and traffic engineering. The use of session-based routing may enable network device 500 to eschew the use of a centralized controller, such as an SDN controller, to perform path selection and traffic engineering, and eschew the use of tunnels. In some examples, network device 500 may implement session-based routing as Secure Vector Routing (SVR), provided by Juniper Networks, Inc. In the case where network device 500 comprises a session-based router operating as a network gateway for a site of an enterprise network (e.g., router 187A of FIG. 1B), network device 500 may establish multiple peer paths (e.g., logical path 189 of FIG. 1B) over an underlying physical WAN (e.g., SD-WAN 177 of FIG. 1B) with one or more other session-based routers operating as network gateways for other sites of the enterprise network (e.g., router 187B of FIG. 1B). Network device 500, operating as a session-based router, may collect data at a peer path level, and report the peer path data to NMS 130.

In examples where network device 500 comprises a packet-based router, network device 500 may employ a packet- or flow-based routing scheme to forward packets according to defined network paths, e.g., established by a centralized controller that performs path selection and traffic engineering. In the case where network device 500 comprises a packet-based router operating as a network gateway for a site of an enterprise network (e.g., router 187A of FIG. 1B), network device 500 may establish multiple tunnels (e.g., logical path 189 of FIG. 1B) over an underlying physical WAN (e.g., SD-WAN 177 of FIG. 1B) with one or more other packet-based routers operating as network gateways for other sites of the enterprise network (e.g., router 187B of FIG. 1B). Network device 500, operating as a packet-based router, may collect data at a tunnel level, and the tunnel data may be retrieved by NMS 130 via an API or an open configuration protocol or the tunnel data may be reported to NMS 130 by NMS agent 544 or other module running on network device 500.

The data collected and reported by network device 500 may include periodically-reported data and event-driven data. Network device 500 is configured to collect logical path statistics via bidirectional forwarding detection (BFD) probing and data extracted from messages and/or counters at the logical path (e.g., peer path or tunnel) level. In some examples, network device 500 is configured to collect statistics and/or sample other data according to a first periodic interval, e.g., every 3 seconds, every 5 seconds, etc. Network device 500 may store the collected and sampled data as path data, e.g., in a buffer.

In some examples, network device 500 optionally includes an NMS agent 544. NMS agent 544 may periodically create a package of the statistical data according to a second periodic interval, e.g., every 3 minutes. The collected and sampled data periodically-reported in the package of statistical data may be referred to herein as “oc-stats.” In some examples, the package of statistical data may also include details about clients connected to network device 500 and the associated client sessions. NMS agent 544 may then report the package of statistical data to NMS 130 in the cloud. In other examples, NMS 130 may request, retrieve, or otherwise receive the package of statistical data from network device 500 via an API, an open configuration protocol, or another of communication protocols. The package of statistical data created by NMS agent 544 or another module of network device 500 may include a header identifying network device 500 and the statistics and data samples for each of the logical paths from network device 500. In still other examples, NMS agent 544 reports event data to NMS 130 in the cloud in response to the occurrence of certain events at network device 500 as the events happen. The event-driven data may be referred to herein as “oc-events.”

In some examples, network device 500 includes device localization module 536. Device localization module 536 of network device 500 may include an example or alternative implementation of device localization module 236 of FIG. 2 or device localization module 336 of FIG. 3.

FIG. 6 illustrates an example of determining a location of a target device based on directional information of signals, in accordance with one or more techniques of this disclosure. In the example of FIG. 6, devices 600 may include devices 600A-600E (collectively referred to herein as “devices 600”). Site 602 and devices 600A-600E of FIG. 6 may include example or alternative implementations of sites 102 and APs 142 of FIG. 1A. Devices 600 may include example or alternative implementations of UEs 148 are other devices at site 602. FIG. 6 may be discussed with respect to FIG. 1A, for example purposes only.

In the example of FIG. 6, device 600A, device 600B, and device 600C (collectively referred to herein as “reference devices 600A-C”) may have known positions at site 602 and device 600D (referred to herein as “target device 600D”) may have an unknown position at site 602. Reference devices 600A-C and/or target device 600D may determine distance measurements between devices 600. For example, one or more of reference devices 600A-C may send signals to target device 600D, such as WI-FI signals at a frequency of 5 GHZ, and may determine, for example, a RTT of the signals sent to and from target device 600D. Based on the RTT of the signals sent to and from target device 600D, the reference devices 600A-C may apply a localization algorithm, such as multilateration techniques, to determine a location of target device 600D. In some instances, target device 600D and/or reference devices 600A-C may send distance measurements (e.g., RTT data) to NMS 130.

In the example of FIG. 6, target device 600D is represented as two possible positions indicated by 600D-1 and 600D-2, where the possible positions of 600D-1 and 600D-2 are equidistant or near equidistant to the reference devices 600A-600C. In other words, target device 600D is illustrated as located in one of possible position 600D-1 or possible position 600D-2. Reference devices 600A-600C may determine that a distance to target device 600D may equally apply to a first position (as illustrated by 600D-1) and a second position (as illustrated by 600D-2).

NMS 130 may determine that device 600D has two possible positions. For example, NMS 130 may obtain directional information of a signal communicated between reference device 600A and target device 600D. NMS 130 may compare the directional information of the signal communicated between reference device 600A and target device 600D (e.g., signal received by reference device 600A from target device 600D in the north-east direction) with an expected positional direction of target device 600D relative to reference device 600A (e.g., south-east direction) and determines that the directional information of the signal communicated between device 600A and target device 600D is inconsistent with the expected positional direction of target device 600D relative to reference device 600A. NMS 130 generates a flag indicating the discrepancy in direction of position 600D-1 relative to device 600A. Similarly, NMS 130 may obtain directional information of a signal communicated between reference device 600B and target device 600D. NMS 130 may compare the directional information of the signal communicated between reference device 600B and target device 600D (e.g., signal received by reference device 600B from target device 600D in the north-east direction) with an expected positional direction of target device 600D relative to reference device 600B (e.g., south-west direction) and determines that the directional information of the signal communicated between reference device 600B and target device 600D is inconsistent with the expected positional direction of target device 600D relative to reference device 600B. NMS 130 generates a flag indicating the discrepancy in direction of position 600D-1 relative to device 600B. NMS 130 continues the process of identifying discrepancies in the direction of target device 600D relative to other reference devices. NMS 130 may compute a number of flags (e.g., three) and compare the number of flags to a threshold. If the threshold is satisfied, NMS 130 may determine that the localization of devices 600 has an error (e.g., that device 600D has two possible positions).

In some examples, NMS 130 may generate a distribution of possible positions of target device 600D based on the distance measurements between devices 600. NMS 130 may determine that the localization of devices 600 has an error (e.g., that device 600D has two possible positions) based on a determination of whether the distribution of possible positions of target device 600D forms a multimodal distribution, such as a multimodal distribution with a first local maxima indicative of first position 600D-1 and a second local maxima indicative of second position 600D-2.

NMS 130 may determine a candidate position of target device 600D based on the directional information of directional beams communicated between reference devices 600A-600C and target device 600D. Reference devices 600A-600C and target device 600D may send directional beams, or a set of directional beams using directional antennas. Reference devices 600A-600C and target device 600D may each listen for directional beams from other devices. Reference devices 600A-C and target device 600D may listen, for example, for a beam with the highest signal strength (referred to herein as the loudest or strongest directional beam) from another device and assign the other device an orientation relative to a direction of the device that sent the loudest directional beam. In the example of FIG. 6, NMS 130 may receive directional information indicative of reference device 600A receiving a loudest directional beam from target device 600D at a particular angle in the east direction. Similarly, NMS 130 may receive directional information indicative of reference device 600B receiving a loudest directional beam from target device 600D at a particular angle in the north-east direction, and/or receive directional information indicative of reference device 600C receiving a loudest directional beam from target device 600D at a particular angle in the north direction. In some examples, reference devices 600A-C may each receive a plurality of loud directional beams from another device and the plurality of loud directional beams may be normalized. Based on the directional information indicating the direction in which the reference devices 600A-C receive the loudest directional beams from target device 600D, NMS 130 may determine target device 600D is in the position indicated by 600D-2.

In some examples, NMS 130 may additionally, or alternatively, determine the location of target device 600D based on the direction in which target device 600D receives the loudest directional beams from reference devices 600A-C. For example, NMS 130 may determine target device 600D is in the north-east direction indicated by position 600D-2 based on a direction in which target device 600D receives a loudest directional beam from one or more of reference devices 600A-C. For example, NMS 130 may receive directional information indicative of target device 600D receiving a loudest directional beam from reference device 600A at a particular angle in the west direction. Similarly, NMS 130 may receive directional information indicative of reference device 600B receiving a loudest directional beam from reference device 600B at a particular angle in the south-west direction, and/or receive directional information indicative of reference device 600C receiving a loudest directional beam from reference device 600C at a particular angle in the south direction. Based on the directional information indicating the direction in which the target device 600D receives the loudest directional beams from reference devices 600A-C, NMS 130 may determine target device 600D is in the east of reference device 600A, north-east of reference device 600B, and north of reference device 600C.

In some examples, NMS 130 may eliminate possible positions based on the directional information indicating the direction in which the reference devices 600A-600C and/or target device 600D receives the loudest directional beams from other APs. For example, NMS 130 may eliminate position 600D-1 as a possible position of target device 600D based on directional information indicative of reference devices 600A-C and/or target device 600D receiving the loudest directional beams from a direction that is inconsistent with the location of position 600D-1.

In some examples, NMS 130 may obtain information from devices that are proximate to a possible position of target device 600D as indicated by 600D-1, such as device 600E. In the example of FIG. 6, NMS 130 may obtain information indicative of whether device 600E detects a signal from target device 600D. For example, NMS 130 may eliminate position 600D-1 as a possible position of device 600D if device 600E does not detect a signal from a device located at position indicated by 600D-1, thus making position 600D-2 a more likely position of target device 600D. NMS 130 may use the determination by device 600E to confirm that position 600D-2 is the correct position of target device 600D, and that the determination by device 600E does not conflict with the directional information of signals communicated between reference devices 600A-600C and target device 600D.

FIG. 7 illustrates an example of determining a location of a target device with limited reference devices based on directional information of signals, in accordance with one or more techniques of this disclosure. In the example of FIG. 7, site 702 may include devices 700A, 700B, and device 700D (collectively referred to herein as "devices 700"). Site 702 and devices 700 of FIG. 7 may include example or alternative implementations of sites 102 and APs 142 of FIG. 1A. Devices 700 may include example or alternative implementations of UEs 148 of FIG. 1A. FIG. 7 may be discussed with respect to FIG. 1A, for example purposes only.

In the example of FIG. 7, device 700A and device 700B (collectively referred to herein as "reference devices 700A-700B") may have known positions at site 702 and device 700D (referred to herein as "target device 700D") may have an unknown position at site 702. NMS 130 may determine a location of target device 700D at site 702. In the example of FIG. 7, reference devices 700A-700B may be the only reference devices available to determine the location of target device 700D. One or more of reference devices 700A-700B may send signals to target device 700D, such as WI-FI signals at a frequency of 5 GHZ, and may determine, for example, a RTT of the signals sent to and from target device 700D. Based on the RTT of the signals sent to and from device 700D, the reference devices 700A-700B may apply a localization algorithm, such as multilateration techniques, to determine a location of target device 700D. In these examples, if target device 700D is an isolated device where there are less than three distance measurements (e.g., a first distance measurement between reference device 700A and target device 700D and a second distance measurement between reference device 700B and target device 700D) to determine the location of target device 700D, the determination of the location of target device 700D may result in two possible positions as indicated by 700D-1 and 700D-2, where the possible positions 700D-1 and 700D-2 are equidistant or near equidistant to the reference devices 700A-700B. In other words, reference devices 700A-700B may determine, from the limited number of distance measurements, that a distance to target device 700D may equally apply to a first possible position (as illustrated by 700D-1) and a second possible position (as illustrated by 700D-2).

NMS 130 may determine that target device 700D is an isolated device based on whether there are less than three distance measurements (e.g., a first distance measurement between reference device 700A and target device 700D and a second distance measurement between reference device 700B and target device 700D). In response to determining that target device 700D is an isolated device, NMS 130 may determine a candidate position of target device 700D based on the directional information of directional beams communicated between reference devices 700A-700B and target device 700D. For example, NMS 130 may obtain directional information indicative of reference device 700A receiving a directional beam from target device 700D at a particular angle in the south-east direction relative to reference device 700A. Similarly, NMS 130 may obtain directional information indicative of reference device 700B receiving a directional beam from target device 700D at a particular angle in the south direction relative to reference device 700B. Additionally, or alternatively, NMS 130 may obtain directional information indicative of target device 700D receiving a directional beam from reference device 700A at a particular angle in the north-west direction relative to target device 700D. Similarly, NMS 130 may obtain directional information indicative of target device 700D receiving a directional beam from reference device 700B at a particular angle in the north direction relative to target device 700D.

NMS 130 may determine whether the directional information of signals communicated between reference devices 700A-700B and target device 700D deviate from a direction in which reference devices 700A-700B are expected to receive a signal from target device 700D. For example, if reference device 700A is expected to receive a directional beam from target device 700D at a particular angle in the north-west direction (e.g., as indicated by position 700D-1), but NMS 130 determines that the directional information of the signal communicated between reference device 700A and target device 700D is indicative of reference device 700A receiving a directional beam from target device 700D at a particular angle in the south-east direction, NMS 130 may eliminate (e.g., by applying an error bias) position 700D-1 as a candidate position of target device 700D. Similarly, if reference device 700B is expected to receive a directional beam from target device 700D at a particular angle in the north-west direction (e.g., as indicated by position 700D-1), but NMS 130 determines that the directional information of the signal communicated between reference device 700B and target device 700D is indicative of reference device 700B receiving a directional beam from target device 700D at a particular angle in the south-east direction, NMS 130 may eliminate (e.g., by applying an error bias) position 700D-1 as a candidate position of target device 700D.

FIG. 8 illustrates an example of determining a location of a device with a single reference device based on directional information of signals, in accordance with one or more techniques of this disclosure. In the example of FIG. 8, site 802 may include devices 800A-800D (collectively referred to herein as "devices 800"). Site 802 and devices 800A-800D of FIG. 8 may include example or alternative implementations of sites 102 and APs 142 of FIG. 1A. FIG. 8 may be discussed with respect to FIG. 1A, for example purposes only.

In the example of FIG. 8, device 800A (referred to herein as "reference device 800") may have a known position at site 802 and device 800D (referred to herein as "target device 800D") may have an unknown position at site 802. In this example, reference device 800A may be the only reference device that may determine distance measurements, based on, for example, an FTM protocol, relative to target device 800D (e.g., due to target device 800D being in communication range of reference device 800A). For example, devices 800B and 800C are unable to communicate 5 GHz Wi-Fi signals to target device 800D, and thus are unable to determine the distance between device 800B and target device 800D or the distance between device 800C and target device 800D according to an FTM protocol, whereas reference device 800A is able to communicate 5 GHz Wi-Fi signals to target device 800D and may determine an estimated or expected location of target device 800D according to the FTM protocol. Target device 800D may be referred to herein as an isolated device because there is only a single reference device 800A that can perform distance measurements of target device 800D.

In this example, NMS 130 may determine a location of target device 800D based on directional information of signals communicated between devices 800A-800C and target device 800D. For example, NMS 130 may further refine the location of target device 800D based on directional information of signals communicated between devices 800B and target device 800D and/or between devices 800C and target device 800D. As described above, the signals communicated between devices 800A-800C and target device 800D may include BLE signals or other signals communicated at a lower frequency (e.g., a WI-FI signal communicated at 2.4 GHz) and may reach farther distances. In the example of FIG. 8, NMS 130 may obtain directional information of signals communicated between devices 800A-800C and target device 800D. NMS 130 may refine, based on the directional information of signals, the estimated location of target device 800D to position window 888.

NMS 130 may narrow down two or more possible positions of target device 800D, determined based on distance measurements between reference device 800A and target device 800D, to a candidate position represented as position window 888. NMS 130 may determine position window 888 by narrowing down a probability band specifying two or more possible positions of target device 800D (e.g., a probability band around target device 800D determined based on distance measurements between reference device 800A and target device 800D, as well as based on directional information of signals communicated between reference device 800A and target device 800D, as illustrated by probability band 886). Position window 888 may be a reduced version of probability band 886 specifying a likely location of target device 800D based on directional information between target device 800D and devices 800A-C. In some instances, NMS 130 may determine position window 888 as a candidate position based on directional information of signals communicated between reference device 800A and target device 800D. In some examples, NMS 130 may add a weight to directional information of signals communicated between devices 800A-800C and target device 800D. NMS 130 may determine a candidate position as position window 888 based on the weights added to the directional information. For example, NMS 130 may determine position window 888 as a range of likely positions based on the intersection of directional beams target device 800D received from devices 800A-800C.

Figure 9:
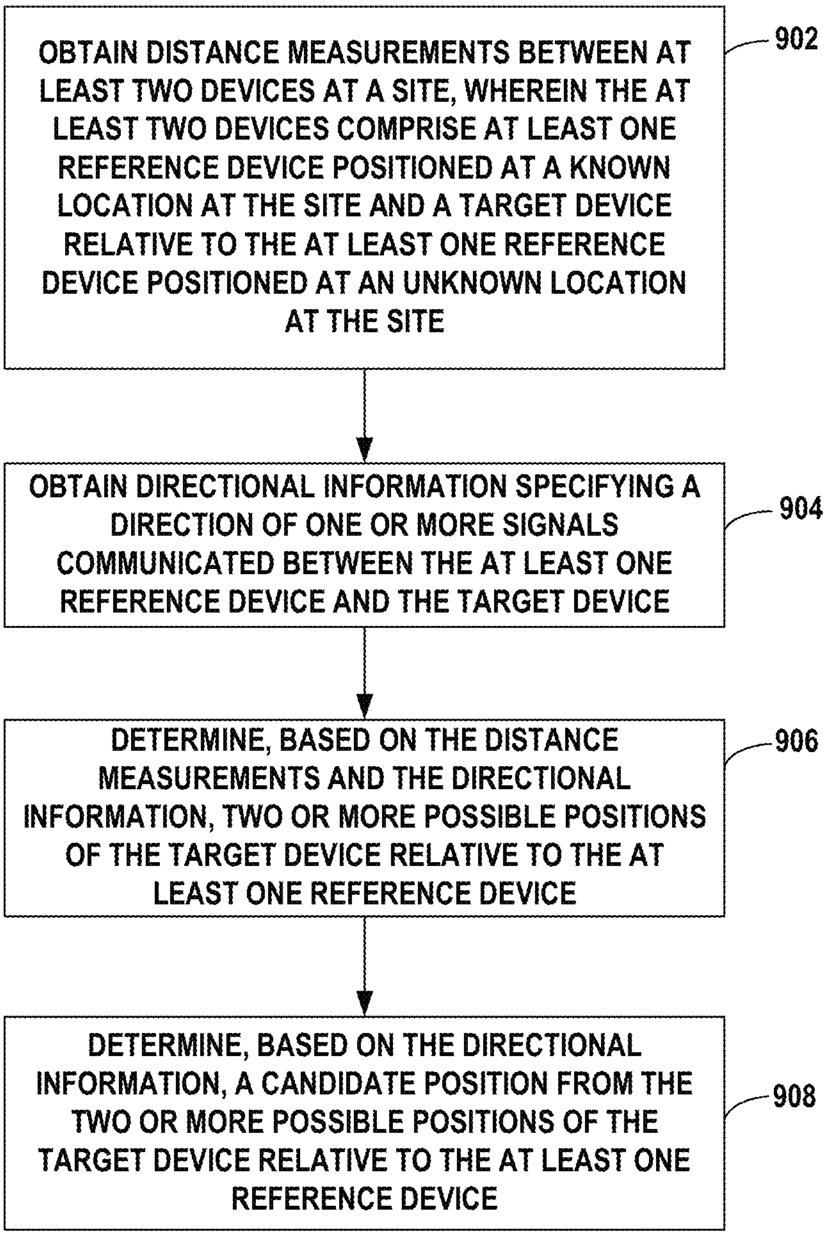
FIG. 9 is a flow chart illustrating an example operation for localization of devices at a site, in accordance with one or more techniques of this disclosure.

FIG. 9 is a flow chart illustrating an example operation for localization of devices at a site, in accordance with one or more techniques of this disclosure. FIG. 9 may be discussed with respect to FIG. 1A for example purposes only.

NMS 130 may obtain distance measurements between at least two devices at a site, wherein the at least two devices comprise at least one reference device positioned at a known location at the site and a target device relative to the at least one reference device positioned at an unknown location at the site (902). For example, the at least one reference device may send a signal (e.g., a 5 GHz signal) to the target device to determine distance measurements between the target device and the at least one reference device according to a FTM protocol. In this example, NMS 130 may obtain the distance measurements from the at least one reference device.

NMS 130 may obtain directional information specifying a direction of one or more signals communicated between the at least one reference device and the target device (904). For example, NMS 130 may obtain directional information from the at least one reference device specifying a direction an antenna of the at least one reference device received a loudest BLE signal from the target device. Alternatively, or additionally, NMS 130 may obtain directional information from the target device specifying a direction an antenna of the target received a loudest BLE signal from the at least one reference device.

NMS 130 may determine, based on the distance measurements and the directional information, two or more possible positions of the target device relative to the at least one reference device (906). NMS 130 may check for discrepancies between an expected positional direction of the target device relative to the at least one reference device and the directional information of signals communicated between the at least one reference device and the target device and may flag any discrepancies. Responsive to NMS 130 determining a number of flagged discrepancies satisfies a threshold (e.g., a predefined number of flags), NMS 130 may trigger a correction process to resolve a localization error (e.g., flip ambiguity) associated with the expected direction. In some examples, NMS 130 may, alternatively or additionally, trigger the correction process by determining, based on the distance measurements, a probability distribution of possible positions of the target device is multimodal, such that local maxima of the probability distribution represent the two or more possible positions. NMS 130 may initiate the correction process by creating a multimodal distribution of the possible positions and applying error biases to possible positions based on the directional information.

NMS 130 may determine, based on the directional information, a candidate position from the two or more possible positions of the target device relative to the at least one reference device (908). For example, NMS 130 may determine the candidate position of the target device by selecting a local maxima from the multimodal distribution with the least amount of error bias. In some instances, NMS 130 may cluster possible positions (e.g., local maxima from the multimodal distribution) by grouping possible positions that or similar or nearby to each other. NMS 130 may eliminate possible positions (e.g., local maxima or clustered local maxima from the multimodal distribution) based on the error bias until one or more possible positions with the least amount of error bias remains. NMS 130 may determine one or more candidate positions as the one or more remaining possible positions. NMS 130 may reorient the target device based on the one or more candidate positions. In instances where NMS 130 determines multiple candidate positions, NMS 130 may determine whether there are discrepancies between the directional information and the direction the target device is from the at least one reference device based on an expected direction of each of the candidate positions. NMS 130 may place a user interface element indicating a location of the target device on the site map based on the candidate position with the fewest number of flagged discrepancies.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively, or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A network management system comprising:

memory; and one or more processors in communication with the memory and configured to:

obtain distance measurements between at least two devices at a site, wherein the at least two devices comprise at least one reference device positioned at a known location at the site and a target device relative to the at least one reference device positioned at an unknown location at the site;

obtain directional information specifying a direction of one or more signals communicated between the at least one reference device and the target device;

determine, based on the distance measurements and the directional information, two or more possible positions of the target device relative to the at least one reference device; and determine, based on the directional information, a candidate position from the two or more possible positions of the target device relative to the at least one reference device.

2. The network management system of claim 1, wherein to determine the candidate position from the two or more possible positions of the target device relative to the at least one reference device, the one or more processors are configured to:

determine a multimodal distribution of the two or more possible positions of the target device;

apply a bias to at least one of the two or more possible positions based on the directional information; and determine the candidate position based on applying the bias to at least one of the two or more possible positions based on the directional information.

3. The network management system of claim 1, wherein to determine the candidate position from the two or more possible positions of the target device relative to the at least one reference device, the one or more processors are configured to:

determine a probability window as the candidate position based on the directional information.

4. The network management system of claim 1, wherein to determine the two or more possible positions of the target device relative to the at least one reference device, the one or more processors are configured to:

determine a discrepancy between a first direction indicative of a positional direction of the target device and a second direction indicative of the direction of a signal of the one or more signals communicated between the at least one reference device and the target device, wherein the first direction is determined based on the distance measurements; and generate one or more flags based on the discrepancy.

5. The network management system of claim 4, wherein the one or more processors are further configured to:

determine a number of the one or more flags;

compare the number of the one or more flags to a threshold; and determine the candidate position based on determining that the number of flags satisfies the threshold.

6. The network management system of claim 1, wherein to determine the candidate position, the one or more processors are further configured to:

eliminate a possible position from the two or more possible positions based on determining whether a proximate device to the target device detects a signal from the target device from the possible position.

7. The network management system of claim 1, wherein the one or more processors are further configured to place a user interface element indicating a location of the target device on a site map of the site based on the candidate position.

8. A method comprising:

obtaining, by one or more processors, distance measurements between at least two devices at a site, wherein the at least two devices comprise at least one reference device positioned at a known location at the site and a target device relative to the at least one reference device positioned at an unknown location at the site;

obtaining, by the one or more processors, directional information specifying a direction of one or more signals communicated between the at least one reference device and the target device;

determining, based on the distance measurements and the directional information, two or more possible positions of the target device relative to the at least one reference device; and determining, based on the directional information, a candidate position from the two or more possible positions of the target device relative to the at least one reference device.

9. The method of claim 8, wherein determining the candidate position from the two or more possible positions of the target device relative to the at least one reference device comprises:

determining a multimodal distribution of the two or more possible positions of the target device;

applying a bias to at least one of the two or more possible positions based on the directional information; and determining the candidate position based on applying the bias to at least one of the two or more possible positions based on the directional information.

10. The method of claim 8, wherein determining the candidate position from the two or more possible positions of the target device relative to the at least one reference device comprises:

determining a probability window as the candidate position based on the directional information.

11. The method of claim 8, wherein determining the two or more possible positions of the target device relative to the at least one reference device comprises:

determining a discrepancy between a first direction indicative of a positional direction of the target device and a second direction indicative of the direction of a signal of the one or more signals communicated between the at least one reference device and the target device, wherein the first direction is determined based on the distance measurements; and generating one or more flags based on the discrepancy.

12. The method of claim 11, further comprising:

determining a number of the one or more flags;

comparing the number of the one or more flags to a threshold; and determining the candidate position based on determining that the number of flags satisfies the threshold.

13. The method of claim 8, wherein determining the candidate position comprises:

eliminating a possible position from the two or more possible positions based on determining whether a proximate device to the target device detects a signal from the target device from the possible position.

14. The method of claim 8, further comprising:

placing a user interface element indicating a location of the target device on a site map of the site based on the candidate position.

15. Non-transitory computer-readable storage media comprising instructions that, when executed, cause one or more processors to:

obtain distance measurements between at least two devices at a site, wherein the at least two devices comprise at least one reference device positioned at a known location at the site and a target device relative to the at least one reference device positioned at an unknown location at the site;

obtain directional information specifying a direction of one or more signals communicated between the at least one reference device and the target device;

determine, based on the distance measurements and the directional information, two or more possible positions of the target device relative to the at least one reference device; and determine, based on the directional information, a candidate position from the two or more possible positions of the target device relative to the at least one reference device.

16. The non-transitory computer-readable storage media of claim 15, wherein to determine the candidate position from the two or more possible positions of the target device relative to the at least one reference device, the instructions cause the one or more processors to:

determine a multimodal distribution of the two or more possible positions of the target device;

apply a bias to at least one of the two or more possible positions based on the directional information; and determine the candidate position based on applying the bias to at least one of the two or more possible positions based on the directional information.

17. The non-transitory computer-readable storage media of claim 15, wherein to determine the candidate position from the two or more possible positions of the target device relative to the at least one reference device, the instructions cause the one or more processors to:

determine a probability window as the candidate position based on the directional information.

18. The non-transitory computer-readable storage media of claim 15, wherein to determine the two or more possible positions of the target device relative to the at least one reference device, the instructions cause the one or more processors to:

determine a discrepancy between a first direction indicative of a positional direction of the target device and a second direction indicative of the direction of a signal of the one or more signals communicated between the at least one reference device and the target device, wherein the first direction is determined based on the distance measurements; and generate one or more flags based on the discrepancy.

19. The non-transitory computer-readable storage media of claim 15, wherein to determine the candidate position, the instructions cause the one or more processors to:

eliminate a possible position from the two or more possible positions based on determining whether a proximate device to the target device detects a signal from the target device from the possible position.

20. The non-transitory computer-readable storage media of claim 15, wherein the instructions further cause the one or more processors to:

place a user interface element indicating a location of the target device on a site map of the site based on the candidate position.

* * * * *